USO09060078B2

(12) United States Patent
Szymanski

(10) Patent No.: US 9,060,078 B2
(45) Date of Patent: Jun. 16, 2015

(54) PRINTER CONSISTENCY MEASUREMENT, EVALUATION AND CORRECTION

(75) Inventor: Kirk Szymanski, E Fallowfield Township, PA (US)

(73) Assignee: RICOH COMPANY, LTD., Tokyo (JP)

( * ) Notice: Subject to any disclaimer, the term of this patent is extended or adjusted under 35 U.S.C. 154(b) by 338 days.

(21) Appl. No.: 13/483,702

(22) Filed: May 30, 2012

(65) Prior Publication Data
US 2013/0322701 A1 Dec. 5, 2013

(51) Int. Cl.
G06K 9/00 (2006.01)
H04N 1/00 (2006.01)
G06K 15/02 (2006.01)
H04N 1/40 (2006.01)
H04N 1/60 (2006.01)

(52) U.S. Cl.
CPC .......... *H04N 1/00058* (2013.01); *G06K 15/027* (2013.01); *H04N 1/00015* (2013.01); *H04N 1/00031* (2013.01); *H04N 1/00045* (2013.01); *H04N 1/00068* (2013.01); *H04N 1/40006* (2013.01); *H04N 1/6036* (2013.01)

(58) Field of Classification Search
None
See application file for complete search history.

(56) References Cited

U.S. PATENT DOCUMENTS

| | | | | | |
|---|---|---|---|---|---|
| 4,937,662 | A | * | 6/1990 | Matsunawa et al. | 358/538 |
| 4,974,067 | A | * | 11/1990 | Suzuki et al. | 358/534 |
| 5,023,812 | A | * | 6/1991 | Pfeiffer | 358/1.1 |
| 5,313,291 | A | * | 5/1994 | Appel et al. | 358/501 |
| 5,856,876 | A | * | 1/1999 | Sasanuma et al. | 358/300 |
| 6,418,281 | B1 | * | 7/2002 | Ohki | 399/49 |
| 6,654,143 | B1 | * | 11/2003 | Dalal et al. | 358/1.9 |
| 6,791,716 | B1 | * | 9/2004 | Buhr et al. | 358/1.9 |
| 6,832,824 | B1 | * | 12/2004 | Baker et al. | 347/19 |
| 7,027,182 | B1 | * | 4/2006 | Soler | 358/1.9 |
| 7,069,164 | B2 | * | 6/2006 | Viturro et al. | 702/85 |
| 7,411,700 | B2 | * | 8/2008 | Johnson | 358/1.9 |
| 7,431,210 | B2 | * | 10/2008 | Kikuchi et al. | 235/438 |
| 7,679,785 | B2 | * | 3/2010 | Ehbets et al. | 358/1.9 |
| 8,743,437 | B2 | * | 6/2014 | Ikeda | 358/518 |
| 2003/0086108 | A1 | * | 5/2003 | Barkis | 358/1.13 |
| 2003/0231350 | A1 | * | 12/2003 | Yamagishi | 358/3.06 |
| 2004/0202365 | A1 | * | 10/2004 | Spaulding et al. | 382/162 |
| 2004/0227964 | A1 | * | 11/2004 | Fujino | 358/1.9 |
| 2005/0071104 | A1 | * | 3/2005 | Viturro et al. | 702/85 |
| 2006/0103899 | A1 | * | 5/2006 | Wu | 358/504 |
| 2006/0152759 | A1 | * | 7/2006 | Chen et al. | 358/1.15 |
| 2006/0197966 | A1 | * | 9/2006 | Viturro et al. | 358/1.9 |
| 2006/0285134 | A1 | * | 12/2006 | Viturro et al. | 358/1.9 |
| 2007/0002344 | A1 | * | 1/2007 | Klassen | 358/1.9 |
| 2007/0041060 | A1 | * | 2/2007 | Kikuchi et al. | 358/504 |
| 2007/0091138 | A1 | * | 4/2007 | Hersch et al. | 347/19 |
| 2007/0146742 | A1 | * | 6/2007 | Klassen | 358/1.9 |
| 2008/0030787 | A1 | * | 2/2008 | McElvain | 358/3.26 |
| 2008/0043263 | A1 | * | 2/2008 | Hancock et al. | 358/1.9 |
| 2008/0145125 | A1 | * | 6/2008 | Mestha et al. | 400/76 |
| 2008/0225325 | A1 | * | 9/2008 | Chen et al. | 358/1.14 |
| 2008/0252677 | A1 | * | 10/2008 | Tajika et al. | 347/16 |
| 2009/0141306 | A1 | * | 6/2009 | Yamada | 358/1.15 |
| 2009/0231645 | A1 | * | 9/2009 | Hayashi | 358/520 |
| 2009/0237689 | A1 | * | 9/2009 | Tokunaga et al. | 358/1.9 |
| 2009/0296112 | A1 | * | 12/2009 | Gil et al. | 358/1.9 |
| 2010/0149568 | A1 | * | 6/2010 | Owens | 358/1.9 |

(Continued)

*Primary Examiner* — Wenpeng Chen
(74) *Attorney, Agent, or Firm* — Cooper & Dunham LLP

(57) ABSTRACT

Systems, apparatus and methods are provided for objective, quantitative assessment of printer image quality. Quantitative scores are determined for objective analysis and evaluation of the age quality produced by the target printer and determining corrective actions to be performed on the printer.

17 Claims, 32 Drawing Sheets

(56) References Cited

U.S. PATENT DOCUMENTS

| | | |
|---|---|---|
| 2010/0238459 A1* | 9/2010 | Yamazaki ............... 358/1.5 |
| 2011/0007371 A1* | 1/2011 | Yip et al. ............... 358/504 |
| 2011/0026945 A1* | 2/2011 | Gross et al. ............ 399/27 |
| 2011/0141175 A1* | 6/2011 | Murray et al. .......... 347/14 |
| 2011/0227988 A1* | 9/2011 | Yamazaki ............... 347/19 |
| 2011/0234677 A1* | 9/2011 | Tokunaga et al. ....... 347/19 |
| 2012/0086961 A1* | 4/2012 | Ikeda ..................... 358/1.9 |
| 2012/0092701 A1* | 4/2012 | Wang et al. ............ 358/1.15 |
| 2013/0106936 A1* | 5/2013 | Shin et al. .............. 347/15 |
| 2013/0107290 A1* | 5/2013 | Lin et al. ............... 358/1.9 |
| 2013/0242354 A1* | 9/2013 | Dewancker et al. .... 358/448 |

* cited by examiner

|  |  |  |
|---|---|---|
| M-Score | 50.01 | |
| Intra page consistency | 10.57 | |
| Streaking index | 6.57 | |
| Banding index | 3.09 | |
| | | |
| L DATA | | Variance from Median |
| Max | 55.65 | 2.23 |
| Min | 48.02 | 5.4 |
| Median | 53.42 | |
| | | |
| a DATA | | |
| Max | -0.83 | 1.1 |
| Min | -5.53 | 3.6 |
| Median | -1.93 | |
| | | |
| b DATA | | |
| Max | -5.37 | 1.78 |
| Min | -10.97 | 3.82 |
| Median | -7.15 | |
| | | |
| PATCH DATA | | |
| Delta L | 7.63 | |
| Delta a | 4.70 | |
| Delta b | 5.60 | |
| | | |
| PRIMARY SCAN DATA | | |
| Delta L | 4.61 | |
| Delta a | 2.70 | |
| Delta b | 3.83 | |
| | | |
| SECONDARY SCAN DATA | | |
| Delta L | 2.57 | |
| Delta a | 1.30 | |
| Delta b | 1.11 | |
| | | |
| Banding to Streaking index | 0.69 | |

Fig. 6A

| | | |
|---|---|---|
| M-Score | 50.45 | Indication of visible color variation |
| Intra page consistency | 12.28 | |
| Streaking index | 7.03 | Indication of streaking |
| Banding index | 3.46 | |

| | | Variance from Median |
|---|---|---|
| L DATA | | |
| Max | 34.41 | 3.03 |
| Min | 25.46 | 5.92 |
| Median | 31.38 | |
| a DATA | | |
| Max | -1.91 | 2.01 |
| Min | -7.03 | 3.11 |
| Median | -3.92 | |
| b DATA | | |
| Max | -4.57 | 2.29 |
| Min | -11.24 | 4.38 |
| Median | -6.86 | |
| PATCH DATA | | |
| Delta L | 8.95 | |
| Delta a | 5.12 | |
| Delta b | 6.67 | |
| PRIMARY SCAN DATA | | |
| Delta L | 5.25 | |
| Delta a | 2.50 | |
| Delta b | 3.94 | |
| SECONDARY SCAN DATA | | |
| Delta L | 2.81 | |
| Delta a | 1.53 | |
| Delta b | 1.32 | |
| Long to short Impact | 0.88 | |

Fig. 6B

| | | |
|---|---|---|
| M-Score | 57.62 | |
| Intra page consistency | 8.35 | |
| Streaking index | 6.24 | |
| Banding index | 1.62 | |
| L DATA | | Variance from Median |
| Max | 75.02 | 2.36 |
| Min | 69.60 | 3.06 |
| Median | 72.66 | |
| a DATA | | |
| Max | 1.04 | 1.12 |
| Min | -2.04 | 1.96 |
| Median | -0.08 | |
| b DATA | | |
| Max | -3.97 | 2.11 |
| Min | -9.52 | 3.44 |
| Median | -6.08 | |
| PATCH DATA | | |
| Delta L | 5.42 | |
| Delta a | 3.08 | |
| Delta b | 5.55 | |
| PRIMARY SCAN DATA | | |
| Delta L | 3.94 | |
| Delta a | 1.97 | |
| Delta b | 4.42 | |
| SECONDARY SCAN DATA | | |
| Delta L | 0.98 | |
| Delta a | 0.66 | |
| Delta b | 1.11 | |
| Banding to Streaking index | 0.52 | |

Fig. 6C

| | | |
|---|---|---|
| M-Score | 78.46 | |
| Intra page consistency | 6.22 | |
| Streaking index | 4.07 | |
| Banding index | 1.40 | |
| L DATA | | Variance from Median |
| Max | 88.67 | 1.51 |
| Min | 85.18 | 1.98 |
| Median | 87.16 | |
| a DATA | | |
| Max | 13.85 | 3 |
| Min | 9.03 | 1.82 |
| Median | 10.85 | |
| b DATA | | |
| Max | -6.67 | 0.71 |
| Min | -8.47 | 1.09 |
| Median | -7.38 | |
| PATCH DATA | | |
| Delta L | 3.49 | |
| Delta a | 4.82 | |
| Delta b | 1.80 | |
| PRIMARY SCAN DATA | | |
| Delta L | 2.41 | |
| Delta a | 3.18 | |
| Delta b | 0.81 | |
| SECONDARY SCAN DATA | | |
| Delta L | 0.73 | |
| Delta a | 1.08 | |
| Delta b | 0.50 | |
| Banding to Streaking index | 0.75 | |

Fig. 6D

| | | |
|---|---|---|
| M-Score | 82.57 | |
| Intra page consistency | 4.67 | |
| Streaking index | 3.03 | |
| Banding index | 1.40 | |
| L DATA | | Variance from Median |
| Max | 83.17 | 2.16 |
| Min | 78.62 | 2.39 |
| Median | 81.01 | |
| a DATA | | |
| Max | 1.27 | 0.13 |
| Min | 0.98 | 0.16 |
| Median | 1.14 | |
| b DATA | | |
| Max | -3.04 | 0.6 |
| Min | -4.03 | 0.39 |
| Median | -3.64 | |
| PATCH DATA | | |
| Delta L | 4.55 | |
| Delta a | 0.29 | |
| Delta b | 0.99 | |
| PRIMARY SCAN DATA | | |
| Delta L | 3.01 | |
| Delta a | 0.09 | |
| Delta b | 0.37 | |
| SECONDARY SCAN DATA | | |
| Delta L | 1.36 | |
| Delta a | 0.10 | |
| Delta b | 0.32 | |
| Banding to Streaking index | 1.13 | |

Fig. 6E

| | | |
|---|---|---|
| M-Score | 82.11 | |
| Intra page consistency | 3.48 | |
| Streaking index | 1.78 | |
| Banding index | 1.36 | |
| | | |
| L DATA | | Variance from Median |
| Max | 86.72 | 0.74 |
| Min | 84.95 | 1.03 |
| Median | 85.98 | |
| | | |
| a DATA | | |
| Max | -5.36 | 0.66 |
| Min | -7.39 | 1.37 |
| Median | -6.02 | |
| | | |
| b DATA | | |
| Max | -13.67 | 0.9 |
| Min | -15.87 | 1.3 |
| Median | -14.57 | |
| | | |
| PATCH DATA | | |
| Delta L | 1.77 | |
| Delta a | 2.03 | |
| Delta b | 2.20 | |
| | | |
| PRIMARY SCAN DATA | | |
| Delta L | 0.94 | |
| Delta a | 1.11 | |
| Delta b | 1.04 | |
| | | |
| SECONDARY SCAN DATA | | |
| Delta L | 0.65 | |
| Delta a | 0.75 | |
| Delta b | 0.93 | |
| | | |
| Banding to Streaking index | 0.84 | |

Fig. 6F

|  |  | Variance from Median |
|---|---|---|
| M-Score | 70.70 | |
| Intra page consistency | 8.55 | |
| Streaking index | 6.49 | |
| Banding index | 1.41 | |
| L DATA | | |
| Max | 94.25 | 1.12 |
| Min | 92.62 | 0.51 |
| Median | 93.13 | |
| a DATA | | |
| Max | -0.49 | 0.87 |
| Min | -2.32 | 0.96 |
| Median | -1.36 | |
| b DATA | | |
| Max | 11.94 | 4.43 |
| Min | 3.75 | 3.76 |
| Median | 7.51 | |
| PATCH DATA | | |
| Delta L | 1.63 | |
| Delta a | 1.83 | |
| Delta b | 8.19 | |
| PRIMARY SCAN DATA | | |
| Delta L | 0.55 | |
| Delta a | 1.36 | |
| Delta b | 6.33 | |
| SECONDARY SCAN DATA | | |
| Delta L | 0.28 | |
| Delta a | 0.37 | |
| Delta b | 1.33 | |
| Banding to Streaking index | 0.67 | |

Fig. 6G

| Type of score | Acceptable value |
|---|---|
| M-Score | > 60 |
| Intra-page consistency | < 6 |
| Streaking index | < 2 |
| Banding index | < 2 |
| Patch data: L* | < 4 |
| Patch data: a* | < 2.5 |
| Patch data: b* | < 2.5 |
| Primary scan data: L* | < 4 |
| Primary scan data: a* | < 2.5 |
| Primary scan data: b* | < 2.5 |
| Secondary scan data: L* | < 4 |
| Secondary scan data: a* | < 2.5 |
| Secondary scan data: b* | < 2.5 |

Fig. 7

PRINTER CONSISTENCY MEASUREMENT, EVALUATION AND CORRECTION

TECHNICAL FIELD

This disclosure relates to tools, such as systems, apparatuses, methodologies, computer program products, etc., for providing quantitative assessment of printer image quality of a print device.

BACKGROUND

In the current information age, there are often discussions of the desirableness of a paperless society. However, notwithstanding such discussions, there remains a great need by users of computers and other terminal devices (including tablets and mobile phones) for printing functionality. Therefore devices having printing functionality, such as printers, copiers, multi-function devices and etc., continue to play a significant role in information technology (IT) at home and at work.

In recent years, color printing has become more and more popular, and the capability of maintaining the quality of printing, both color and black-and-white (B/W), has been of significant importance, such as, for example, in the fields of graphic arts, photography and color film processing. For purposes of ensuring and maintaining color image quality, various tests have been devised, and such tests are performed on, for example, a color printer to detect any image quality issues.

However, such tests involve a user (e.g., an experienced technician) looking at sample test pages printed by a specific print device and determining visually whether the output of the print device contains any image quality issues and determining, based on personal experience, what steps can be taken to resolve such image quality issues.

Although human perception and interpretation of color and image quality can be useful, reliance on such perception and interpretation can be highly subjective. That is, many factors may cause a person's perception of the color of a particular object to be substantially different from the perception of another. In addition, eye fatigue, age, physiological factors, environmental factors, etc., can influence color perception.

The subjective nature of the results produced by such tests makes it difficult to assess, based on such test results, whether adjustment or overhaul of the tested print device should be performed, and to assess the appropriate adjustment in the print system.

There remains a need for an improved method of assessing the quality of printouts output by print devices in an objective manner.

SUMMARY

This disclosure provides tools (in the form of apparatuses, methodologies and systems) for providing objective, quantitative assessment of printer image quality of a target printer.

In an aspect of this disclosure, a system for providing objective assessment of image quality of a target print device comprises a test pattern reading part for reading a test pattern printed by the target print device and outputting spectral data corresponding to the test pattern printed by the target print device, and an analysis part for analyzing the spectral data to determine quantitative scores for the test pattern.

In another aspect, the system includes a corrective action determining part for determining, based on the quantitative scores, corrective actions to be performed.

In another aspect, the objective assessment of image quality is based on one or more quantitative such as localized color variation score, intra-page color inconsistency score, streaking index, banding index, density variation score, hue or chroma variation score, and banding-to-streaking index, etc.

BRIEF DESCRIPTION OF THE DRAWINGS

The aforementioned and other aspects, features and advantages can be better understood from the following detailed description with reference to the accompanying drawings wherein:

FIGS. 6A through 6G show examples of quantitative scores based on test pages printed by a print device;

FIG. 7 shows an example of a quantitative score baseline;

DETAILED DESCRIPTION

Figure 1:
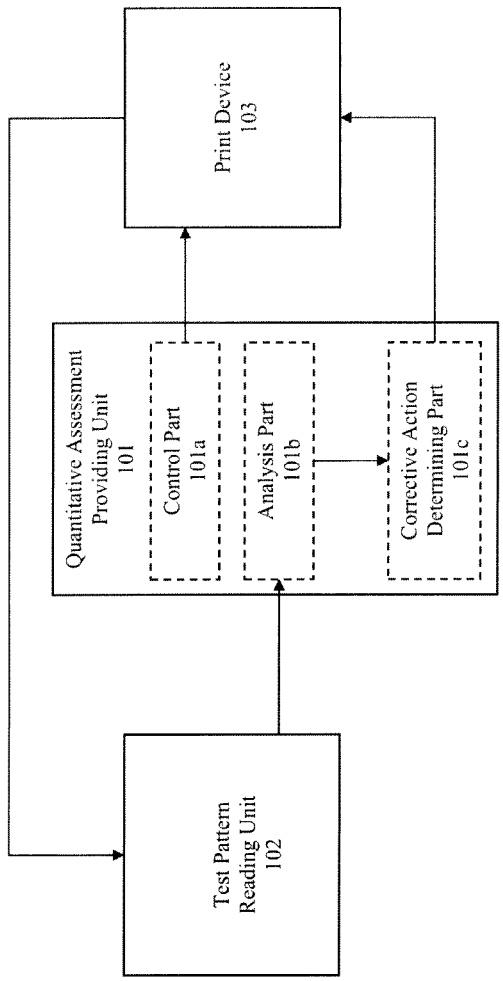
FIG. 1 shows a block diagram of a system herein image quality of output of a print device can be objectively assessed, according to an exemplary embodiment.

This disclosure provides tools (in the form of apparatuses, methodologies and systems) for providing objective, quantitative assessment of printer image quality of a target print device. These functions are performed by various elements in the systems and apparatuses of the exemplary embodiments disclosed in the present disclosure. However, these embodiments are just examples, and one or more of these elements described below can be implemented in a single device or distributed across a network or over a transmission channel, or implemented as hardware or software.

In describing examples and exemplary embodiments illustrated in the drawings, specific terminology is employed for the sake of clarity. However, this disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, FIG. 1 shows a block diagram of a system 100, according to an exemplary embodiment of the present disclosure. The system 100 includes a quality assessment providing unit 101, a test pattern reading unit 102 and a print device 103.

The quality assessment providing unit 101 includes a control part 101a, an analysis part 101b and a corrective action determining part 101c.

The control part 101a supplies image data to the print device 103 to cause the print device 103 to print a test pattern on a contiguous area of a test form. The contiguous area is segmented into plural elements in a primary scan direction (i.e. main scanning direction) and plural elements in a secondary scan direction (i.e. sub-scanning direction). The image data is constituted by constant tone across the contiguous area in both the primary scan direction and the secondary scan direction.

The analysis part 101b analyzes spectral data received from the test pattern reading unit 102 to determine one or more quantitative scores for the test pattern. The analysis part 101b may generate one or more graphical representations of variance of toner density, variance of lightness, variance of a position in a red-green spectrum, variance of a position in a yellow-blue spectrum, and variance of hue, based on the received spectral data or the one or more quantitative scores determined for the test pattern. Examples of such graphical representations are shown in FIGS. 7-21. The generated graphical representations and the one or more scores determined by the analysis part 101b are output to the corrective action determining part 101c.

The corrective action determining part 101c determines one or more corrective actions to be performed on the print device 103, based on the quantitative scores received from the analysis part 101b, to resolve any existing abnormalities in the image quality produced by the print device 103. The graphical representations may also be utilized in making such determination of corrective actions.

After determining the corrective actions to be performed on the print device 103, the corrective action determining part 101c suggests corrective actions to be applied to the print device 103.

If such corrective actions are of the kind that can be performed without human intervention (e.g., altering internal variables, modifying image processing process, etc.), the corrective actions are automatically performed on the print device 103. On the other hand, if the corrective actions cannot be performed without human intervention (e.g., changing a toner or replacing a developer), a list of corrective actions is output to a user (e.g., a system administrator or an IT staff). For example, the list of corrective actions may be displayed on a display screen of the print device 103 or printed out by the print device 103. The list of corrective actions may also include step-by-step directions as to how to carry out each of the corrective/preventive steps. Following such directions (or based on experience), the user can perform the correctives actions on the print device 103 to correct potential problems that may exist in the print device 103.

The test pattern reading unit 102 reads the test pattern printed by the print device 103 and outputs spectral data for the plural elements in the primary scan direction and the plural elements in the secondary scan direction. The spectral data is output to the analysis part 101b of the quantitative assessment providing unit 101.

The test pattern reading unit 102 is preferably a spectrophotometer which is a photometer, a device for measuring light intensity, which can measure the intensity of light as a function of the wavelength of light. Spectrophotometers are different from scanners in that spectrophotometers can in principle operate over the entire wavelength range of the electromagnetic radiation spectrum of light, whereas scanners are tuned to a certain range of light (visual spectrum). However, the range of a spectrophotometer is determined in part by the spectral data that the spectrophotometer is designed to gather, and most spectrophotometers operate in the visible, infrared and ultraviolet ranges of the electromagnetic spectrum. Additional aspects or components of a spectrophotometer are conventional (unless otherwise discussed herein), and in the interest of clarity and brevity are not discussed in detail herein. Such aspects and components are discussed, for example, in U.S. Pat. No. 5,387,977.

An example of such a spectrophotometer is X-Rite i1iSis XL, an automatic chart reader manufactured by X-Rite. The X-Rite i1iSis XL was used as the test pattern reading unit for generating the spectral data in the examples discussed infra. However, the spectrophotometer 102 is not limited to the particular model and can be any spectrophotometer presently known or developed in the future.

Further, the test pattern reading unit may include a high-performance scanner (for example, EPSON® 10000XL), instead of a spectrophotometer (although a spectrophotometer, such as the X-Rite i1iSis XL, is preferred), The test pattern reading unit 102 scans a sheet containing a test pattern and produces numerous measurements based on the test pattern. For example, a test pattern sheet fed into the test pattern reading unit 102 may be segmented into a large number of squares. For each square in the test pattern, the test pattern reading unit 102 takes spectral readings at various wavelengths. For example, if spectral data is sampled at 10 nm intervals from 380 nm to 730 nm, 35 measurements would be made for each of the squares.

After such measurements are made for each square, an L*a*b* value may be derived for each measured area. CIE L*a*b* (the color space in which each L*a*b* value resides) is the most complete color space specified by the International Commission on Illumination. It describes all the colors visible to the human eye and was created to serve as a device independent model to be used as a reference. The three coordinates of CIE L*a*b* represent lightness of the color (L*), its position between red and green (a*), and its position between yellow and blue (b*). However, the measurements can also be converted to coordinates in other color spaces, such as CIE-XYZ, Lab (which is different from L*a*b*), HSL (Hue, Saturation, Lightness), and etc.

The L*a*b* data derived from the measurements is stored in CGATS format (a standard text file format for exchanging color measurement data), and subsequently cut-and-pasted into an Excel spreadsheet for analysis. The data is used to generate quantitative scores for various categories that are useful for identifying image quality issues. Examples of such quantitative scores are shown in FIGS. 6A-6G. The analysis and determination of corrective actions are further described infra with reference to specific quantitative scores in FIGS. 6A-6G.

The print device 103 receives the image data from the control part 101a and prints the test pattern on a contiguous area of a test form, wherein the contiguous area is segmented into plural elements in a primary scan direct (i.e. main scanning direction) and plural elements in a secondary scan direction (i.e. sub-scanning direction). The image data supplied by the control part 101a may be constituted by constant tone (although such constant is not a requirement, and can be replaced by a predetermined pattern, such as a predetermined tonal gradient) across the contiguous area in both the primary and secondary scan directions. The printed test pattern is output to the test pattern reading unit 102 to be scanned.

The quantitative assessment process performed by the system 100 can be initiated, for example, at the request of a system administrator or IT staff, or automatically as part of a periodic check-up.

Figure 2:
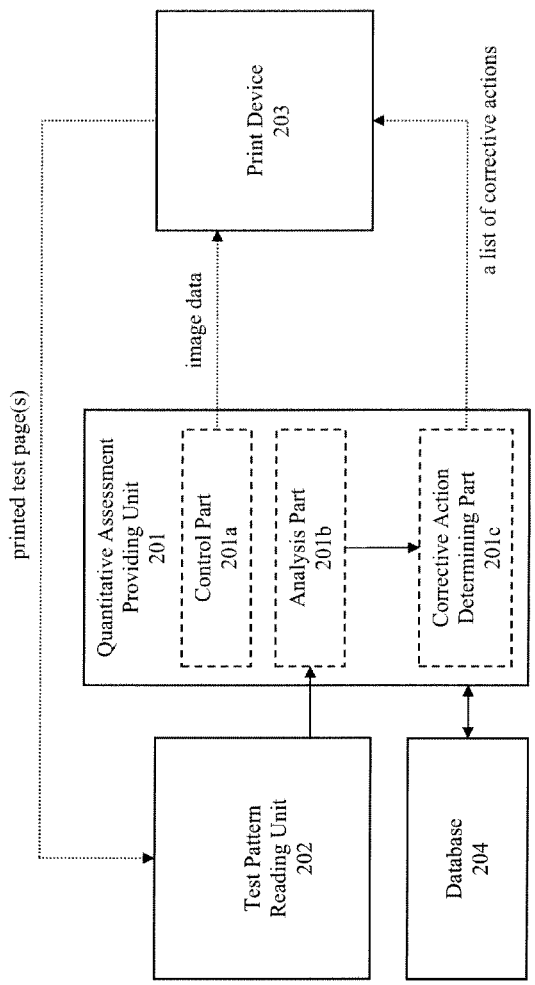
FIG. 2 shows a block diagram of such a system, according to another exemplary embodiment.

FIG. 2 shows a block diagram of a system 200, according to another exemplary embodiment of the present disclosure. The system 200 includes a quantitative assessment providing unit 201, a test pattern reading unit 202, a print device 203, and a database 204.

The quantitative assessment providing unit 201 includes a control part 201a, an analysis part 201b and a corrective action determining part 201c.

The dotted lines indicate human intervention. That is, the image data, the printed test page(s) and the list of corrective actions are conveyed via, for example, a system administrator or an IT staff (e.g. by mail). For example, the control part 201a of the quality assessment providing unit 201, which is located externally (i.e. outside the network to which the print device 203 is connected), sends image data (e.g., a file containing such image data) to a system administrator who manages the print device 203. The system administrator sends the image data to the print device 203 to obtain a printout of the image data (i.e. test pages). The system administrator then sends the printed test pages to the test pattern reading unit 202, which reads the test pages and outputs spectral data to the analysis part 201b, which analyzes the spectral data and determines quantitative scores for the test pages printed by the print device 203. Then, the corrective action determining part 201c determines corrective actions to be performed on the print device 203 based on the quantitative scores, and outputs a list of corrective actions. The list of corrective actions is sent back to the system administrator, who can perform the corrective actions on the print device 203 to fix any defects that exist within the print device 203.

Additionally, the database 204 may store results of the quantitative assessment performed by the quantitative assessment providing unit 201. The results stored in the database 204 can be used to compare, for example, all assessment results for a specific printer model. From such a comparison, various information that may be useful in carrying out quantitative assessment of printer image quality, such as, for example, an average lifespan of a printer, an average image quality degradation rate of a particular printer model, typical image quality produced by a particular printer model given the age of the printer, may be obtained.

Otherwise, the operation of the system 200 is similar to that of the system 100 of FIG. 1.

The system 200 may be used in a case that an owner of a printer wishes to perform a check-up on the printer but lacks any equipment to do so. A testing form package can be sent to the owner (e.g., via e-mail), and the testing form package can be printed using the printer to be tested. The printed testing forms are mailed to a quantitative assessment service provider which can perform the necessary analysis on the printed testing forms and determine corrective steps to fix any existing problems. The corrective steps to be performed on the printer can be mailed back to the owner so that he or she can perform the corrective steps, or a trained technician can travel to the office in which the printer is located and perform the corrective steps. Or, in a case of an enterprise or a large organization, a limited number of practitioners may be designated and trained to execute any necessary corrective actions on the target print device.

The network utilized by the systems 100 and 200 (i.e. the network over which the quantitative t providing unit, the test pattern reading unit, the print device and the database communicate with each other) can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network. In addition, the network preferably uses TCP/IP (Transmission Control Protocol/Internet Protocol), but other protocols can also be used. How devices can connect to and communicate over the network is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 3:
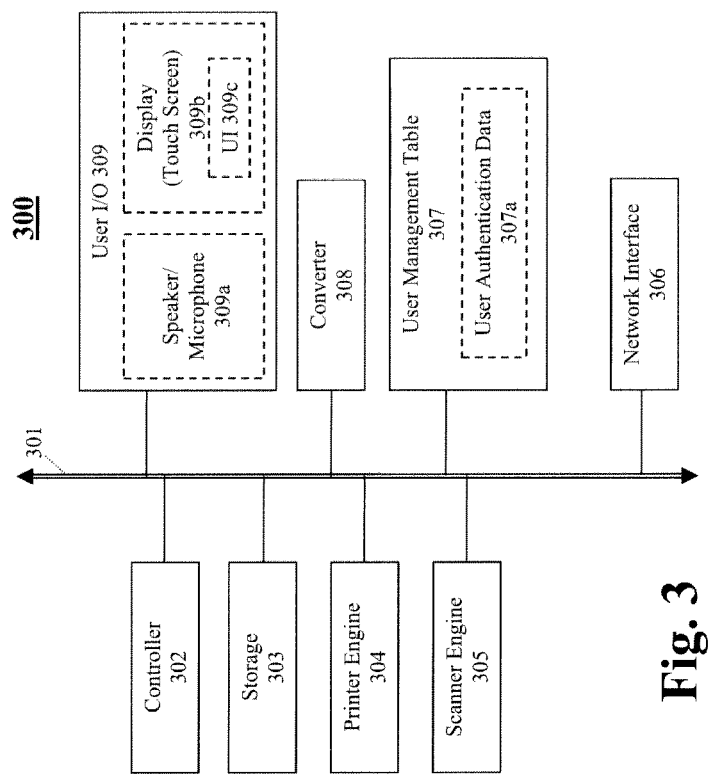
FIG. 3 shows a block diagram of an exemplary configuration of a print device in the system shown in FIG. 1, according to an exemplary embodiment.

The print devices 103 and 203 of FIGS. 1 and 2, respectively, will now be discussed in connection with an exemplary configuration of a multi-function device (MFD) which includes a printing function (and additionally can serve as a user terminal for entering, saving and accessing electronic data) with reference to FIG. 3, FIG. 3 shows an example of a configuration of the print devices 103 and 203 of FIGS. 1 and 2, which can be an MFD with scanning and printing functions, and additionally can serve as a user terminal for entering, saving and accessing electronic data or documents. In addition, an MFD can include a resident database.

The MFD 300 shown in FIG. 3 includes a controller 302, and various elements connected to the controller 302 by an internal bus 301. The controller 302 controls and monitors operations of the MFD 300. The elements connected to the controller 302 include storage 303 (for example, random access memory, read-only memory, hard disk drive, portable storage media drive such as for optical discs, magnetic discs, magneto-optical discs, etc., semiconductor memory cards, combinations of storage media, etc.), printer engine 304, scanner engine 305, network interface (I/F) 306, converter 308 for converting data from one format to another format (for example, a format suitable for printing, faxing, e-mailing, etc.), and user I/O (Input/Output) 309. The controller 302 also utilizes information stored in user management table 307 to authenticate the user and control user access to the functionalities of the MFD 300.

Storage 303 can include one or more storage parts or devices, and program code instructions can be stored in one or more parts or devices of storage 303 and executed by the controller 302 to carry out the instructions. Such instructions can include instructions for performing specified functions (such as printing, scanning, faxing, copying, e-mailing, etc.) of the MFD 300, to enable the MFD 300 to interact with a terminal, as well as perhaps other external devices, through the network interface 306, and to control the converter 308, access data in the user management table 307, and interactions with users through the user I/O 309.

The network interface 306 is utilized by the MFD 300 to communicate with, for example, the quantitative assessment providing unit 101 of FIG. 1, and receive image data from the control part 101a of the quantitative assessment providing unit 101.

The user I/O 309 includes one or more display screens that display, under control of controller 302, information allowing the user of the MFD 300 to interact with the MFD 300. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD 300, so as to allow the operator to interact conveniently with services provided on the MFD 300, or with the MFD 300 serving as terminal for accessing electronic data or other content through the network. User interfaces or other contents received through the network via the network interface 306 can be displayed on the display screen.

The display screen does not need to be integral with, or embedded in, a housing of the MFD 300, but may simply be coupled to the MFD 300 by either a wire or a wireless connection. The user I/O 309 may include keys and/or buttons (such as graphical keys or buttons, or other graphical elements, of a GUI on a touchscreen display) for inputting information or requesting various operations. Alternatively, the user I/O 309 and the display screen may be operated by a keyboard, a mouse, a remote control, voice recognition (e.g., through a speaker/microphone 309a or eye-movement tracking, or a combination thereof.

Printer engine 304, scanner engine 305 and network interface 306 are otherwise conventional, and therefore, a detailed description of such conventional aspects is omitted in the interest of clarity and brevity.

The MFD 300 can have any or all of the functionalities of similar devices conventionally known, such as for printing, scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hard-copy documents to electronic documents.

Figure 4:
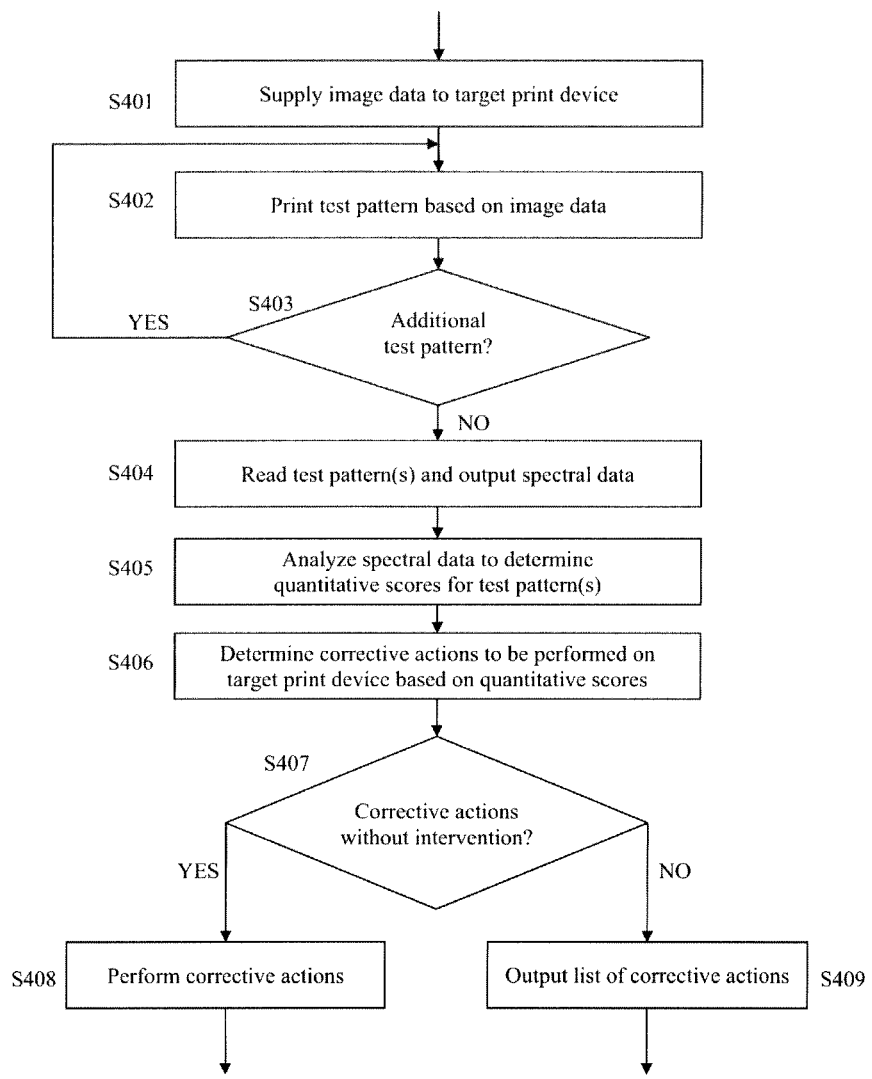
FIG. 4 shows a flowchart for a method of providing quantitative assessment of printer image quality, according to an exemplary embodiment.

With reference to FIG. 4, a method of providing quantitative assessment of quality of output by a target print device is described below in connection with the system 100 of FIG. 1.

In the example shown in FIG. 4, the control part 101a of the quantitative assessment providing unit 101 supplies image data to the print device 103 to cause the print device 103 to print a test pattern on a contiguous area of a test form (step S401). The contiguous area is segmented into plural elements in a primary scan direction and plural elements in a secondary scan direction. The image data can be constituted by constant tone, a predetermined tonal gradient, or another predetermined variable tone pattern, across the contiguous area in both the primary scan direction and the secondary scan direction.

The print device 103 receives the image data and prints the test pattern based on the received image data on the contiguous test form (step S402). If the image data contains additional test patterns to be printed (S403, YES), the print device 103 repeats the printing process until all the test patterns are printed. Once the print device 103 finishes printing all the test patterns contained in the image data (S403, NO), the printed test pattern(s) is output to the test pattern reading unit 102 to be read. The test pattern reading unit 102 reads the printed test pattern(s) and outputs spectral data for the plural elements in the primary scan direction and the plural elements in the secondary scan direction (step S404). The spectral data is output to the analysis part 101b of the quantitative assessment providing unit 101, and the analysis part 101b analyzes the received spectral data to determine one or more quantitative scores for the test pattern(s) (step S405). If there are multiple printed test patterns, one or more quantitative scores are produced for each test pattern (i.e. test sheet containing the test pattern). The one or more scores determined by the analysis part 101b are output to the corrective action determining part 101c. The corrective action determining part 101c determines one or more corrective actions to be performed on the print device 103, based on the received one or more quantitative scores (step S406). For example, each quantitative score indicates the extent to which a particular image quality issue is present. By checking whether a particular quantitative score is within the range of acceptable values for the particular image quality issue, the corrective action determining part 101c can determine whether the print device 103 suffers from the particular image quality issue, and further determine appropriate corrective actions to be performed on the print device 103. Rather than relying on subjective cues to identify image quality issues, the corrective action determining part 101c works with numerical values (provided by the analysis part 101b) which allow straightforward comparison.

If the corrective actions determined by the corrective action determining part 101c are of the kind that can be performed without human intervention (e.g., altering internal variables, modifying image processing process, etc.) (S407, YES), the corrective actions are automatically performed on the print device 103 (step S408). On the other hand, if the corrective actions cannot be performed without human intervention (e.g., changing a toner or replacing a developer) (S407, NO), a list of corrective actions is output to a user (e.g., system administrator or IT staff). For example, the list of corrective actions may be displayed on a display screen of the print device 103 or printed out by the print device 103. The list of corrective actions may also include step-by-step directions as to how to carry out each of the corrective/preventive steps. Following such directions (or based on experience), the user can perform the correctives actions on the print device 103 to correct potential problems that may exist in the print device 103.

As explained above, the system 100 of FIG. 1, for example, provides quantitative assessment of printer image quality of a particular print device, thereby allowing objective measurement of printer image quality and objective comparison of before and after results of the printer image quality of the particular print device.

Figure 5:
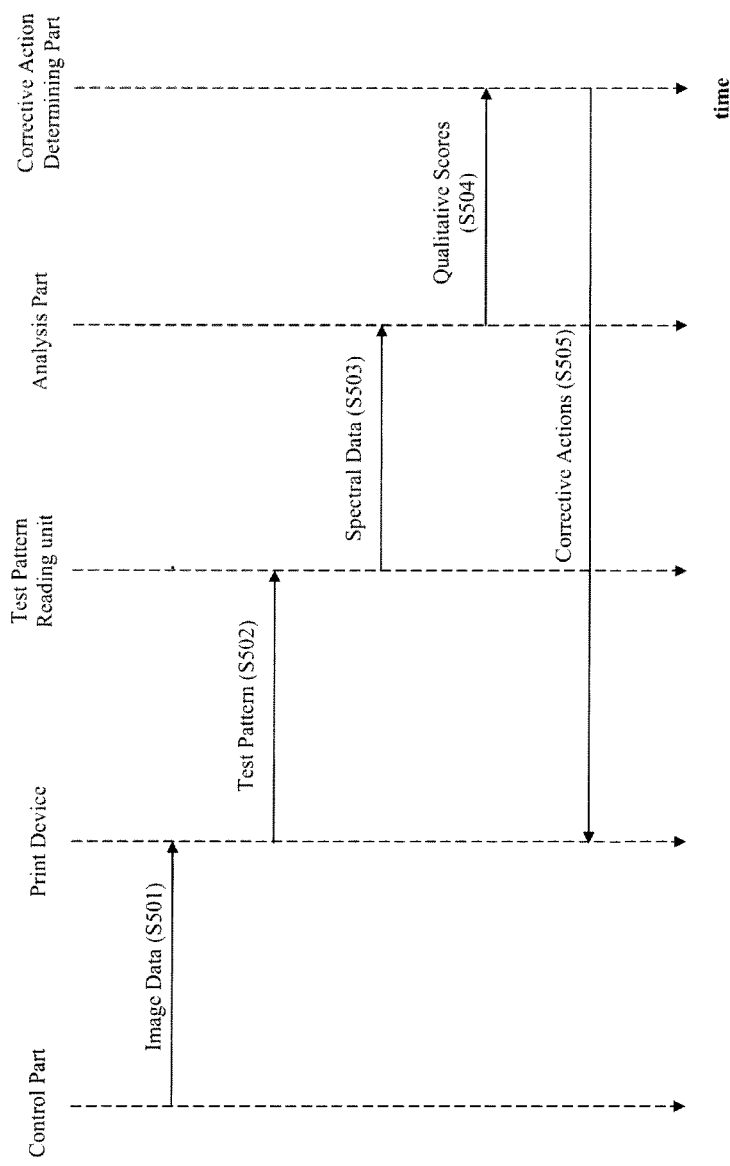
FIG. 5 shows a schematic representation of a dataflow in the system shown in FIG. 1, according to an exemplary embodiment.

FIG. 5 shows an example of dataflow in the method illustrated in FIG. 4, and is discussed in connection with the system 100 of FIG. 1. However, the image quality assessment procedure illustrated in FIG. 5 is not limited to the system configuration of FIG. 1.

First, the control part 101a of the quantitative assessment providing unit 101 supplies image data to the print device 103 (step S501), causing the print device 103 to print a test pattern (i.e. one or more test pages) based on the image data. The printed test pattern is output to the test pattern reading unit 102 (step S502).

In an exemplary embodiment, a test form is output on 12"×18" media on the target printer comprised of a large contiguous area of constant one with guide marks at the edges to direct a test pattern reading unit (for example, an X-Rite i1iSis XL scanning spectrophotometer). Since the form is of constant tone, the printer does not need to be either calibrated or profiled. Screening and resolution parameters are set in the control part to target conditions to be measured. The constant tone greatly minimizes ghosting and edge artifacts introduced by scanning bar in previous targets. The constant tone area is segmented into 2944 6×6 mm squares (64 rows by 46 columns).

The test pattern may include color tone (i.e. Cyan (C), Magenta (M), Yellow (Y), Black (K) toners) and gray tone (i.e. combination of all C, M, Y, K toners) at various density levels. The single toner test patterns target single toner imaging performance, and gray-tone forms measure and evaluate 4-toner combinations. In an exemplary embodiment, the printed test pattern contains (1) process gray tone at 20%, 40% and 65%, (2) single toner colors at 20%, (3) a predetermined density range and (4) a predetermined color range. Each form is individually measured, and evaluation of multiple forms may be used to identify the performance of the printer, and to suggest corrective actions.

For example, a simple test may begin with printing, measuring and evaluating the 40% gray-tone form, followed by additional forms based on the results found and the experience of the personnel who is monitoring the assessment procedure (or based on a software module overseeing the assessment procedure).

In another exemplary embodiment, test patterns may include multiple test forms, each of the form producing its own set of spectral data via the test pattern reading unit 102 and quantitative scores via the analysis part 101b. For example, each of the seven sets of quantitative scores shown in FIGS. 6A-6G correspond to spectral data generated from a different form (three gray forms and four single-toner forms).

In this example, the aforementioned X-Rite i1iSis XL scanning spectrophotometer is used to scan the printed test patterns at a sampling rate of 4 dpi (dots per inch). However, the sampling rate may be increased to support detection of additional imaging defects (e.g. high frequency banding).

Upon scanning the printed test pattern, the test pattern reading unit 102 produces spectral data to be output to and analyzed by the analysis part 101b of the quantitative assessment providing unit 101.

Spectral readings are made of a 3 mm circle in the center of each of the 6×6 mm squares. For each measurement area, spectral data (which is output to the analysis part 101b in step S503 of FIG. 5) is sampled at 10 nm intervals from 380 nm to 730 nm (35 measurements per point, amounting to 35×2944=103,040 measurements per sheet). An L*a*b* value is derived for each measured area (2944 points, 8832 values).

CIE L*a*b* (i.e. L*a*b* value) is the most complete color space specified by the International Commission on Illumination. It describes all the colors visible to the human eye and was created to serve as a device independent model to be used as a reference. The three coordinates of CIE L*a*b* represent lightness of the color (L*), its position between red and green (a*), and its position between yellow and blue (b*).

After measurement, the L*a*b* data is stored in CGATS format (a standard text file format for exchanging color measurement data), and subsequently cut-and-pasted into an Excel spreadsheet for analysis. The data displayed in the spreadsheet (e.g. FIGS. 6-21) is described below.

For example, the acquired spectral data pasted into an Excel spreadsheet is processed and analyzed by the analysis part 101b. The analysis part 101b may use the spectral data (or quantitative scores generated based on the spectral data) to generate graphical representations of variance of tone density, variance of hue and variance of chroma (some of which are shown in FIGS. 7-21).

The quantitative scores generated for the test pattern (using the spectral data provided by the test pattern reading unit 102) include (but not limited to): (a) localized color variation score, (b) an intra-page color inconsistency score, (c) a streaking index, (d) a banding index, (e) a density variation score in the primary scan direction, (f) a hue or chroma variation score in the primary scan direction, (g) a density variation score in the secondary scan direction, (h) a hue or chroma variation score in the secondary scan direction and (i) a banding-to-streaking index. A sample set of quantitative scores is shown in FIG. 6.

Here, banding is formation or presence of visible stripes of contrasting color in the primary scan direction. Similarly, streaking is formation or presence of such visible stripes of contrasting color in the secondary direction.

In the following section, some of the printer consistency measurement and evaluation criteria are explained. In this example, a Ricoh Pro C901 model, which is a production printer designed for high volume environments, was used to print the test forms. However, the quantitative assessment procedure is not limited to the particular printer model used, and any printers being assessed for image quality can be used to print the test forms, and separate quantitative score baselines corresponding to such printers can be developed.

<Quantitative Scores>

(1) M-Score: A single number evaluating the relative rate of change in both the primary scanning direction (i.e. main scanning direction) and the secondary scan direction (i.e. sub-scanning direction), M-Score is based on ISO 15311 (a multi-part digital printing standard). The M-Score computes a single value, scaled from 0 (poor reproduction) to 100 (perfect reproduction), which correlates well with the perception of print variations for a uniform tinted test form printed on digital press systems. The following procedure is used to calculate the M-Score:

(a) Print the supplied 12"×18" test form.

(b) Measure the L*a*b* value of all columns (n) and rows (m) with an xy-scanning measurement device (e.g., X-Rite i1iSis XL) using 6 mm patches.

(c) Average the L*a*b* measurements along the columns and rows. For the 12"×18" format with n=46 columns and m=64 rows, there will be 46 color differences and 64 color differences respectively.

(d) Compute the L*a*b* color difference, $\Delta E_{00}$, for the columns by comparing each column average with its neighbor average. Compute the $\Delta E_{00}$ for the rows by comparing each row average with its neighbor average.

(e) Sum all measurements, and multiply by 10, such as shown by the following formulas (1) and (2), in accordance with the procedure suggested by the ISO standard for computing M-score:

$$\Delta E_{short\_line} = 10 \cdot \Sigma_{t=1}^{n-1} \Delta E_t(Lab_1, Lab_{t+1}) \qquad (1)$$

$$\Delta E_{long\_line} = 10 \cdot \Sigma_{t=1}^{m-1} \Delta E_t(Lab_1, Lab_{t+1}) \qquad (2)$$

(f) Divide by the number of samples, such as shown by the following formula (3):

$$\Delta E_{longEshort} = \frac{\Delta E_{long\_line}}{m-1} + \frac{\Delta E_{short\_line}}{n-1} \qquad (3)$$

(g) Compute the final M-Score, such as shown by the following formula (4):

$$M - \text{Score} = 100 \cdot \frac{1}{2^{\left(\frac{2*\Delta E_{long\&short}}{15}\right)}} \quad (4)$$

Thus, the first derivative of average L*a*b* row and column data is accumulated. In simple language, M-Score primarily measures the frequency and severity of banding and streaking, a higher score being better with a possible range of 0-100. Overall consistency of color across the sheet is a secondary factor in M-Score. An exemplary guideline for gray-tone test forms is as follows (however, it should be appreciated that such values may vary depending on the printing technology):

TABLE 1

<M-Score Guideline>

| | |
|---|---|
| <40 | Severe banding/streaking, probably with customer complaints. |
| 40-50 | Marginal performance. |
| 50-60 | Typical performance. |
| ≥60 | Good performance. |

For example, a blank sheet of paper scores about 95 due to differences in the media and instrument repeatability variance. Single toner test forms typically measure in the 75-85 range.

(2) Intra-page consistency: An overall density/hue/chroma consistency index. The number is calculated as the theoretical maximum delta-E value across the sheet. Delta-E (i.e. ΔE discussed above) is a single number that represents the "distance" between two colors. For example, the idea is that delta-E of 1.0 is the smallest color difference the human eye can see. Thus, generally speaking, any delta-E less than 1.0 is imperceptible, and any delta-E greater than 1.0 is noticeable. An exemplary guideline is:

TABLE 2

<Intra-Page Consistency Guideline>

| | |
|---|---|
| >9 | Poor performance. Indicates very obvious color changes. |
| 8-9 | Marginal performance. Color variation will be obvious in most prints. |
| 6-7.5 | Typical performance. |
| <6 | Good performance. Most customers will not see color variations on most jobs. |

(3) Streaking index: A relative score related to streaking. A lower number is better. The value is calculated as the theoretical delta-E value or all primary scan line average column data.

(4) Banding index: A relative score related to banding. A lower number is better. The value is calculated as the theoretical delta-E value for all secondary scan line average row data. Individual high frequency bands are not detected but will typically affect this value as a change in local density.

(5) L* data, a* data and b* data: The maximum, minimum and median values of L*, a and b* measured on the test form. These are individual measurements and not column or row averaged data.

(6) Patch data: Evaluation of each target patch individually to determine delta L*, a* and b* for the entire test form.

(7) Primary scan data: An evaluation of color in the primary scan direction. The 64 patches in each column are averaged and used to determine delta L*, a* and b* values. Higher values typically indicate streaking and/or color drift in the primary scan direction [from operator side (i.e. the side of the print device where users are working and where the control panels are situated) to non-operator side (i.e. the opposite side of the operator side)]. An exemplary guideline for L* is:

TABLE 3

<Primary Scan Data Guideline for L*>

| | |
|---|---|
| >6 | Poor performance. Density changes are clearly visible. Customers will typically complain of color shifts across the sheet. |
| 4-6 | Typical performance for an unturned device. Density changes are visible. |
| 2-4 | Good performance. Density changes may be visible but will not likely be objectionable for most customers and applications except large areas of constant tone. |
| <2 | Excellent performance. |

An exemplary guideline for a* and b* is:

TABLE 4

<Primary Scan Data Guideline for a* and b*>

| | |
|---|---|
| >5 | Poor performance. Hue changes are clearly visible with blue/cyan and magenta/red areas showing as streaks. Most customers will declare prints with constant tone areas unacceptable. |
| 2.5-5 | Typical performance. |
| <2.5 | Good performance. |
| <1.5 | Excellent performance. However, performance at this level is usually not sustainable and should not be considered a target. |

(8) Secondary scan data: An evaluation of color in the secondary scan direction. The 46 patches in each row are averaged and used to determine delta L*, a* and b* values. Higher values typically indicate banding and/or color drift in the secondary scan direction (from lead edge, the edge of a sheet being fed into the print device, to trail edge, the opposite edge of the lead edge). An exemplary guideline for L* is:

TABLE 5

<Secondary Scan Data Guideline for L*>

| | |
|---|---|
| >6 | Poor performance. Density changes are clearly visible. Customers will typically complain of bands. |
| 4-6 | Typical performance for an unturned device. Density changes are visible. |
| 2-4 | Good performance. Density changes may be visible but will not likely be objectionable for most customers and applications except large areas of constant tone. |
| <2 | Excellent performance. |

An exemplary guideline for a* and b* is:

TABLE 6

<Secondary Scan Data Guideline for a* and b*>

| | |
|---|---|
| >5 | Poor performance. Hue changes are clearly visible with blue/cyan and magenta/red areas showing as bands. Most customers will declare prints with constant tone areas unacceptable. |
| 2.5-5 | Typical performance. |
| <2.5 | Good performance. |
| <1.5 | Excellent performance. However, performance at this level is usually not sustainable and should not be considered a target. |

(9) Banding to streaking index: A number indicating the proportional effect of banding and streaking. A value greater than one indicates banding is predominant. A value less than one indicates streaking is predominant.

The aforementioned quantitative scores, or any others, indicate the extent of various potential image quality issues (e.g. streaking, banding and density variation), and thus, the quantitative scores can be used to identify any image quality issues the print device might be having, for example, by comparing the quantitative scores to predetermined acceptable values.

<Graphs>

The spectral data produced by the test pattern reading unit 102 is processed and graphed, for example, as indicated below.

<L* Data Sheet>

The L* data for each row and column is averaged and graphed as indicated below.

Figure 8A:
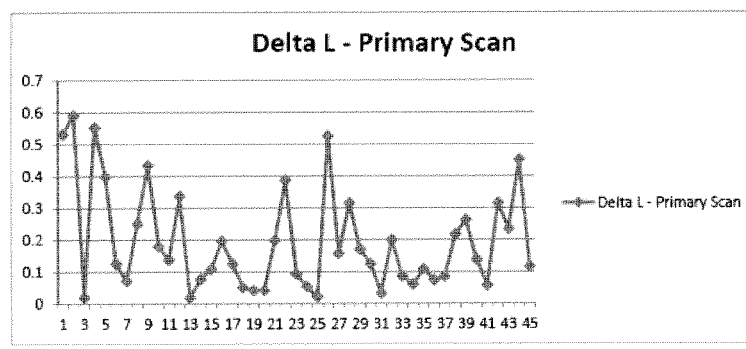
FIGS. 8A through 13B show examples of graphs based on spectral data obtained from test pages printed by a print device.

(1) Delta L*—Primary Scan: Rate of change of L* (density) in the primary scan direction (operator side to non-operator side). Each point indicates delta L* for column n to column n+1. High points indicate the edge of a measurable streak. Since this graph indicates rate of change and not absolute value, a gradual change in density across the sheet will not result in obvious changes. Desired state is relatively low and uniform line with an absence of peaks with a value over two times the average. Absolute value dependent upon the gray/color test form being measured. An example of such a graph is shown in FIG. 8A. In FIG. 8A, peaks indicate edges of streaks, and height indicates severity of streaking.

Figure 8B:
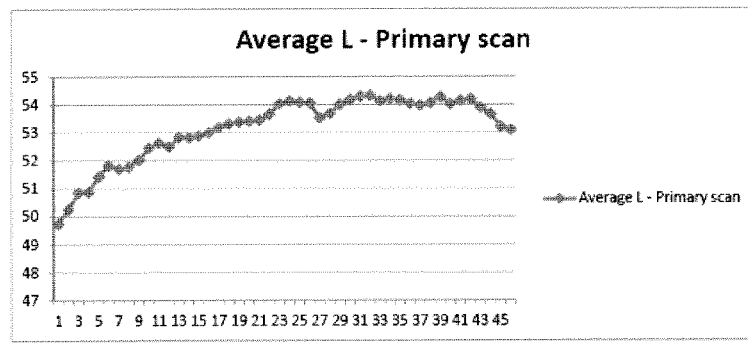

(2) Average L*—Primary Scan: Absolute L* measurement in the primary scan direction. Areas of high positive or negative slope indicate presence of streaking and will match with peaks in the Delta L*—Primary Scan graph discussed above (e.g. shown in FIG. 8A). A rising or falling line indicates a density change in the operator side to non-operator side direction. For example, a relatively lower L* value on the left of the chart indicates a darker area on the operator side. Desired state is a near flat horizontal line with minimal relative value change. Absolute value is not usually relevant between multiple graphs. An example of such a graph is shown in FIG. 8B. FIG. 8B shows that the operator side (right) is noticeably more dense that the non-operator side (left).

Figure 9A:
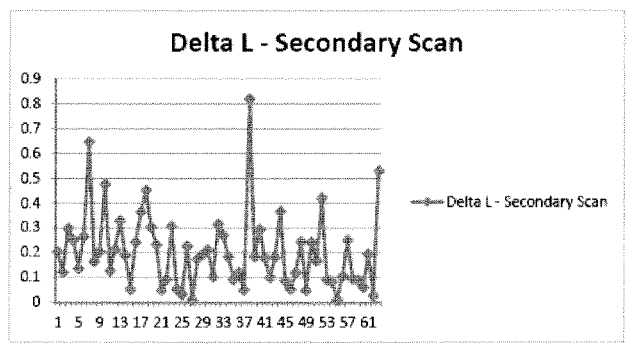

(3) Delta L*—Secondary Scan: Rate of change of L* in the secondary scan direction (leading edge to trail edge). Each point indicates delta L* for row n to row n+1. High points indicate the presence of a measurable band. Since this graph indicates rate of change and not absolute value, a gradual density change in the lead-to-trail edge direction will not result in obvious changes. Desired state is relatively low and uniform line with an absence of peaks over the average. Absolute value is dependent upon the gray/color test form being measured. As previously stated, individual high frequency bands will not necessarily be indicated on this graph due to the sampling size and frequency. An example of such a graph is shown in FIG. 9A. In FIG. 9A, peaks indicate edges of bands, higher peaks indicating higher localized rate of change.

Figure 9B:
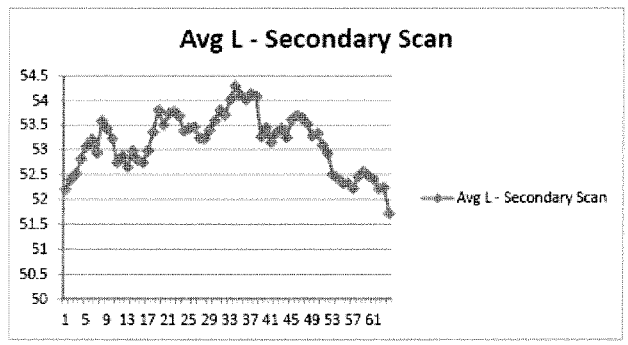

(4) Average L*—Secondary Scan: Absolute L* measurement in the secondary scan direction. Areas of high positive or negative slope indicate presence of banding and will match peaks in the Delta L*—Secondary Scan graph discussed above (e.g. shown in FIG. 9A). A rising or falling line indicates a density change in the lead edge to trail edge direction. For example a lower L* value on the left of the chart indicates a darker area at the lead edge. Desired state is a near flat horizontal line with minimal relative value change. Absolute value is not usually relevant between multiple graphs. An example of such a graph is shown in FIG. 9B.

<a* Data Sheet>

The a* data for each row and column is averaged and graphed as indicated below. For any given measurement, a* will be positive for red, negative for green and 0 for neutrality between red and green. The same general guidelines as indicated in the L* Data sheet apply.

Figure 10A:
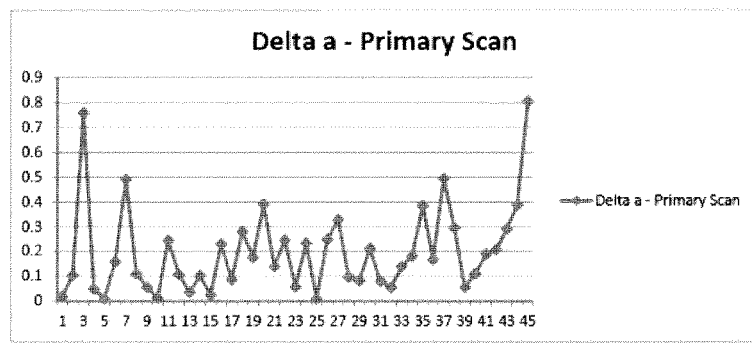

(1) Delta a*—Primary Scan: Rate of change of the a* component in the primary scan direction. An example of such a graph is shown in FIG. 10A.

Figure 10B:
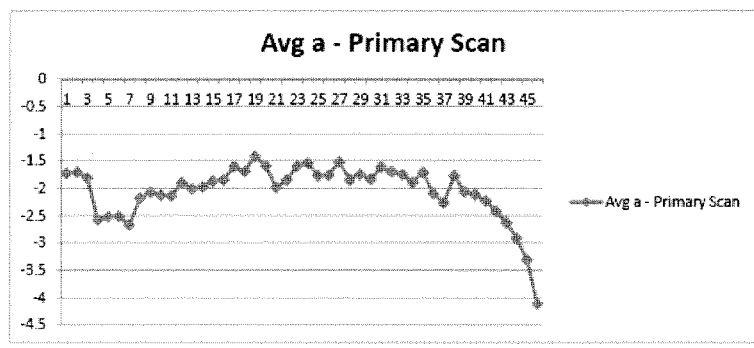

(2) Average a*—Primary Scan: Absolute a* measurement in the primary scan direction. An example of such a graph is shown in FIG. 10B.

Figure 11A:
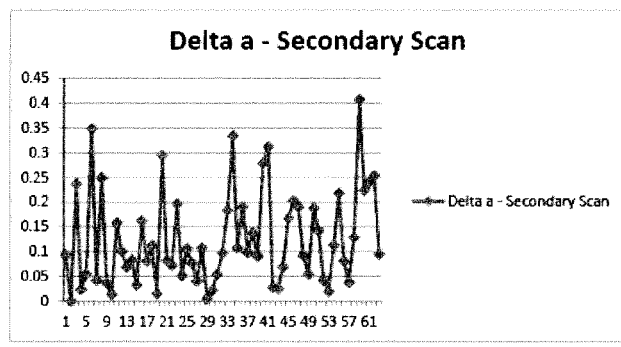

(3) Delta a*—Secondary Scan: Rate of change of the a* component in the secondary scan direction. An example of such a graph is shown in FIG. 11A.

Figure 11B:
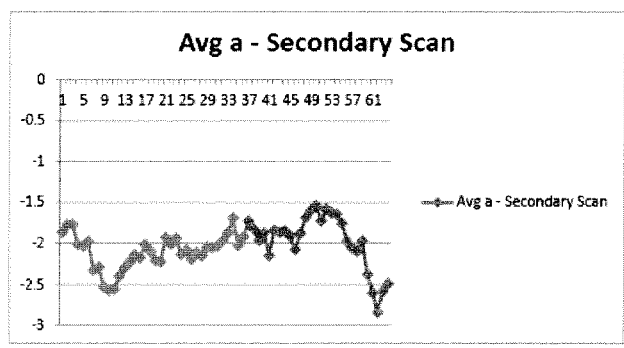

(4) Average a*—Secondary Scan: Absolute a* measurement in the secondary scan direction. An example of such a graph is shown in FIG. 11B.

<b* Data Sheet>

The b* data for each row and column is averaged and graphed as indicated below. For any given measurement, b* will be positive for yellow, negative for blue and 0 for neutrality between yellow and blue. The same general guidelines as indicated in the L* Data sheet apply.

Figure 12A:
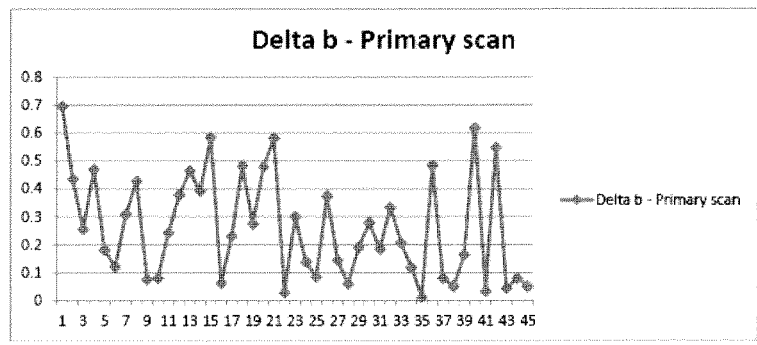

(1) Delta b*—Primary Scan: Rate of change of the b* component in the primary scan direction. An example of such a graph is shown in FIG. 12A.

Figure 12B:
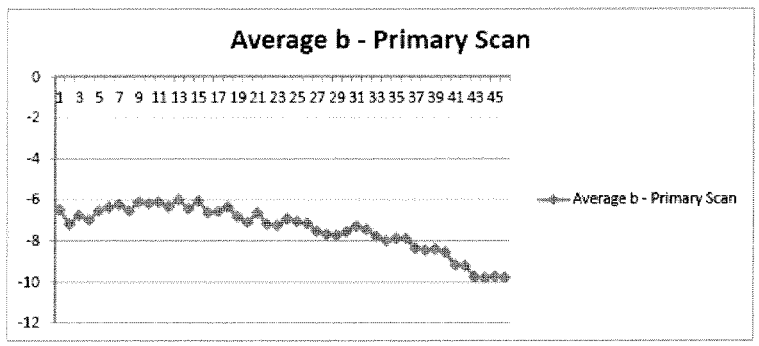

(2) Average b*—Primary Scan: Absolute b* measurement in the primary scan direction. An example of such a graph is shown in FIG. 12B.

Figure 13A:
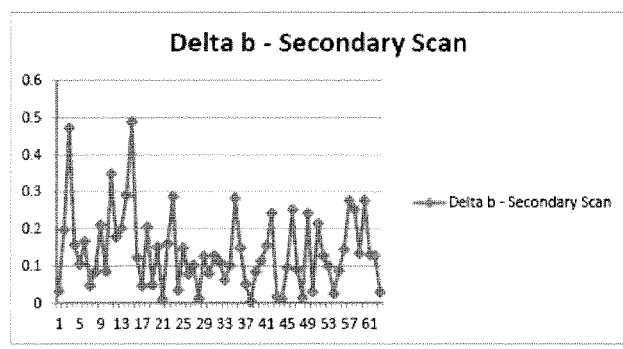

(3) Delta b*—Secondary Scan: Rate of change of the b* component in the secondary scan direction. An example of such a graph is shown in FIG. 13A.

Figure 13B:
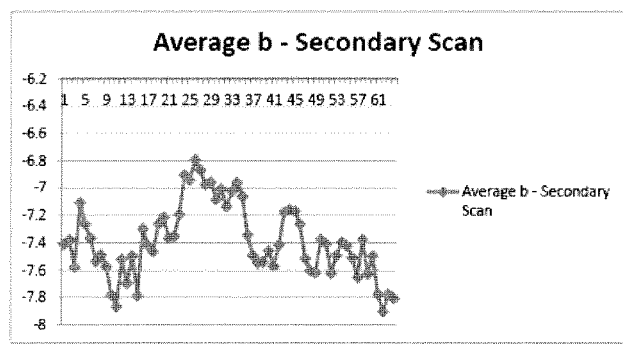

(4) Average b*—Secondary Scan: Absolute b* measurement in the secondary scan direction. An example of such a graph is shown in FIG. 13B.

<Maps>

Each map shows localized patch data. The density and hue variation maps display the relevant raw value for a single patch, either L*, a* or b*. Colors are used to show areas of most variation from the median for the sheet, with more intense/darker colors indicating areas of maximum difference. Since color is used to show relative rather than absolute differences, other data including the aforementioned scores and graphs (i.e. data shown in FIGS. 6-13) should be consulted to determine if the changes shown in the maps are significant or insignificant. The left side of the map corresponds to the non-operator side while the right side of the map corresponds to the operator side. The top of the map corresponds to the trailing edge of the sheet, and the bottom of the map corresponds to the leading edge of the sheet. Values at the top and side of each sheet indicate the measurement band and correspond to the black diamonds on the test form edges. Additional rows of numbers at the top of each map correspond to the center of the respective laser segments for the print device, with Cyan and Yellow increasing from left to right while Magenta and Black decrease from left to right.

Figure 14A:
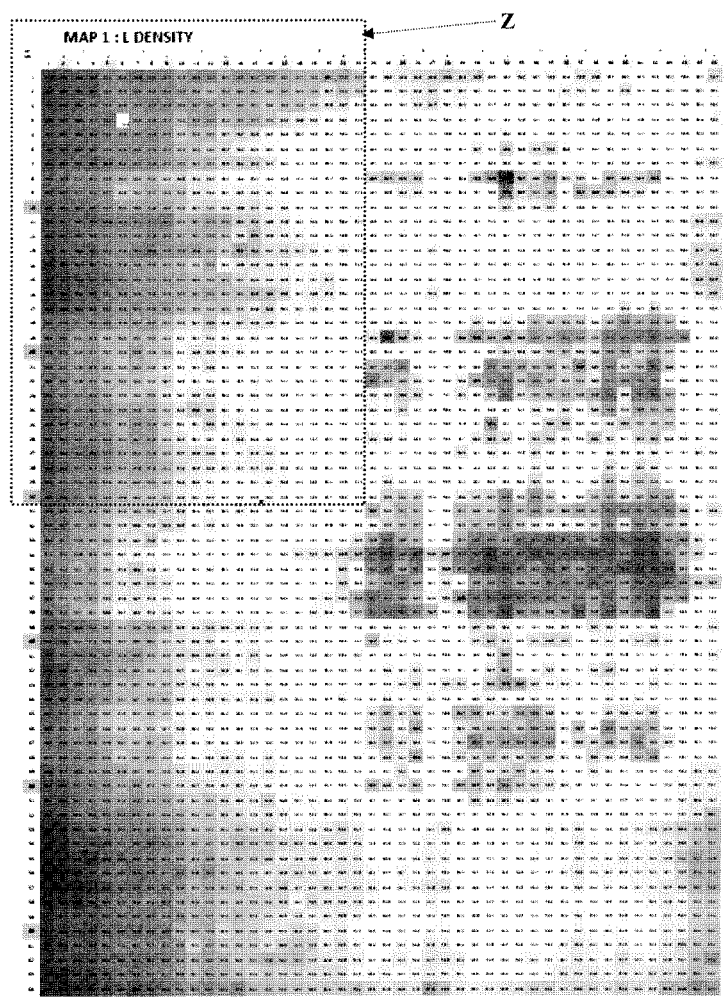
FIG. 14A shows an example of a map from which variance of L* density can be determined.
Figure 14B:
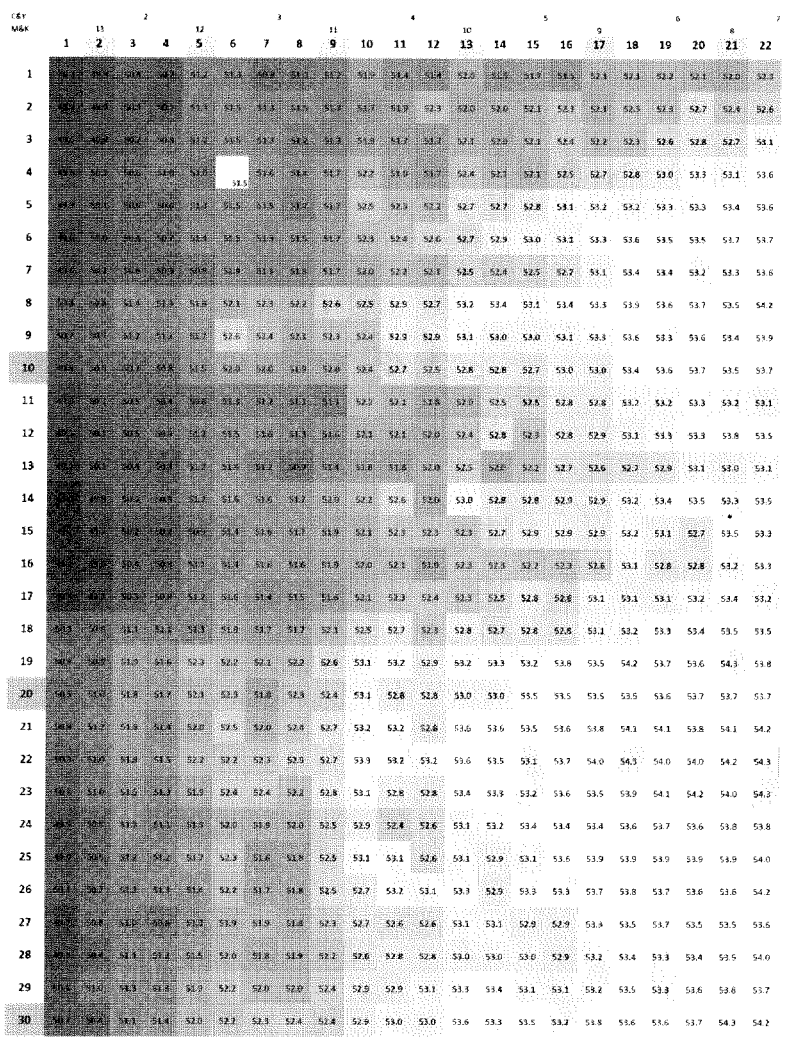
FIG. 14B shows a close-up of region Z of the map shown in FIG. 14A.

(1) Map 1—L* Density: Shows L* data from each measurement patch. Colors are used to map areas of relatively high and low density. High densities are indicated by red, low densities are indicated by blue and near median densities are indicated by white. An example of such a map is shown in FIG. 14A. A close-up of region Z of the map shown in FIG. 14A is provided in FIG. 14B. As shown in FIG. 14B the density variation is indicated by the shade of the color as well as by the numerical value corresponding to each square.

Figure 15:
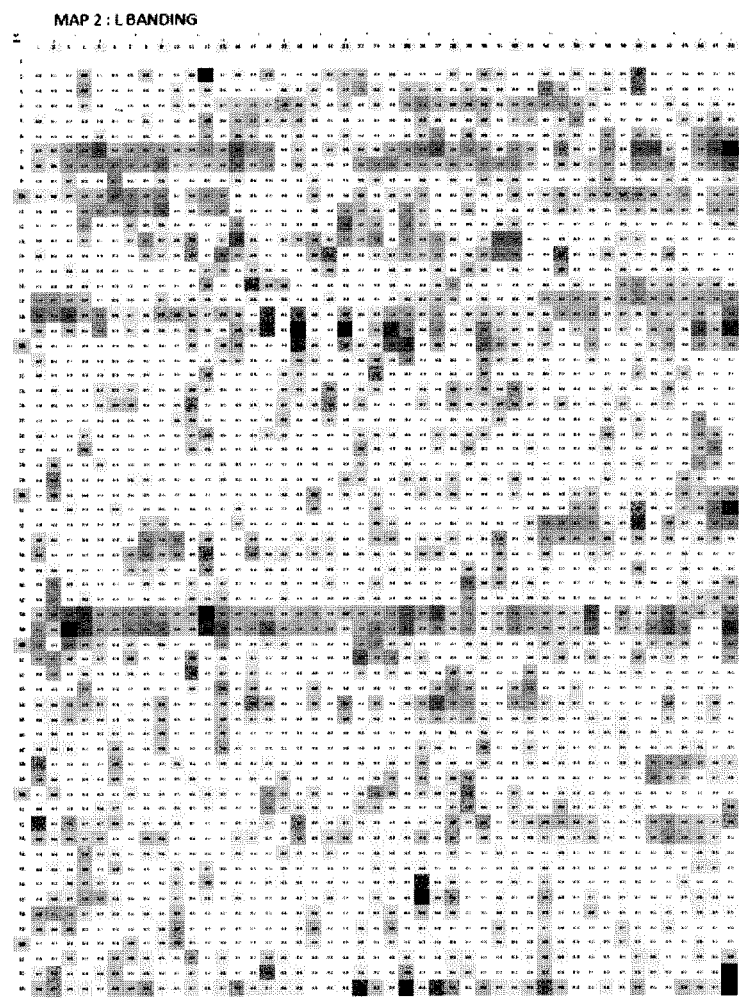
FIG. 15 shows an example of a map from which L* banding can be determined.

(2) Map 2—L* Banding: Calculates areas of rapid density change by comparing and mapping L* component of multiple adjacent vertical patches. Areas of high density change are indicated by black/dark yellow while areas of low density change are indicated by white to light yellow. Areas of high density change indicate edges of bands or other localized high density changes. An example of such a map is shown in FIG. 15.

Figure 16:
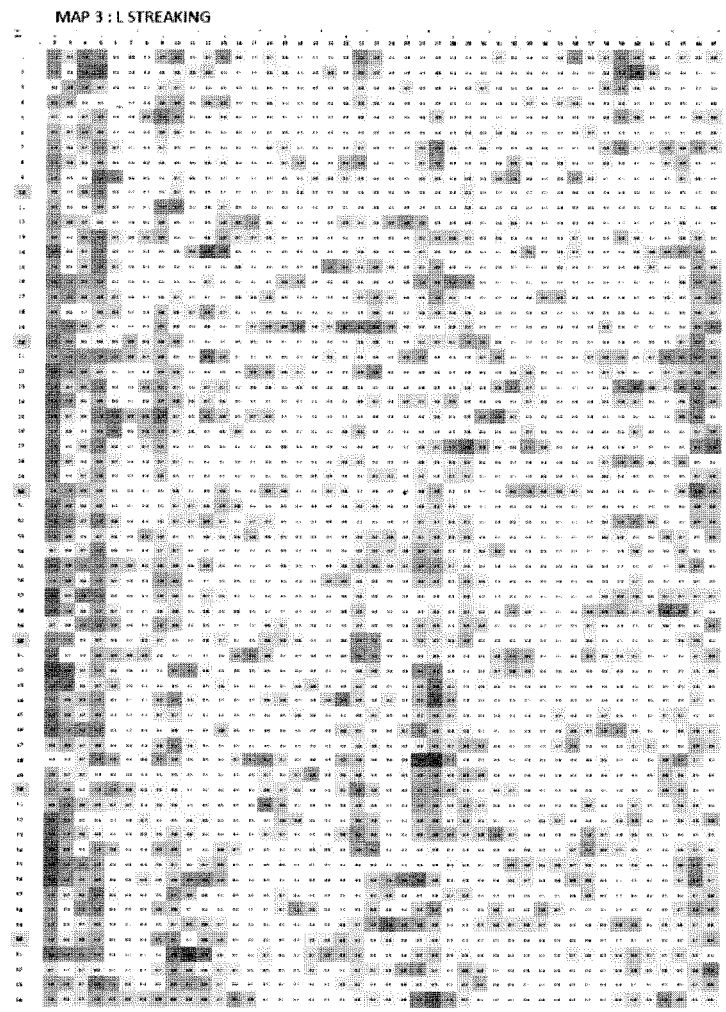
FIG. 16 shows an example of a map from which L* streaking can be determined.

(3) Map 3—L* Streaking: Calculates areas of rapid density changes by comparing and mapping L* component of multiple adjacent horizontal patches. Areas of high density change are indicated by dark to medium reddish while areas of low density change are indicated by white to yellowish. Areas of high density change indicate edges of streaks or other localized high density changes. An example of such a map is shown in FIG. 16.

Figure 17:
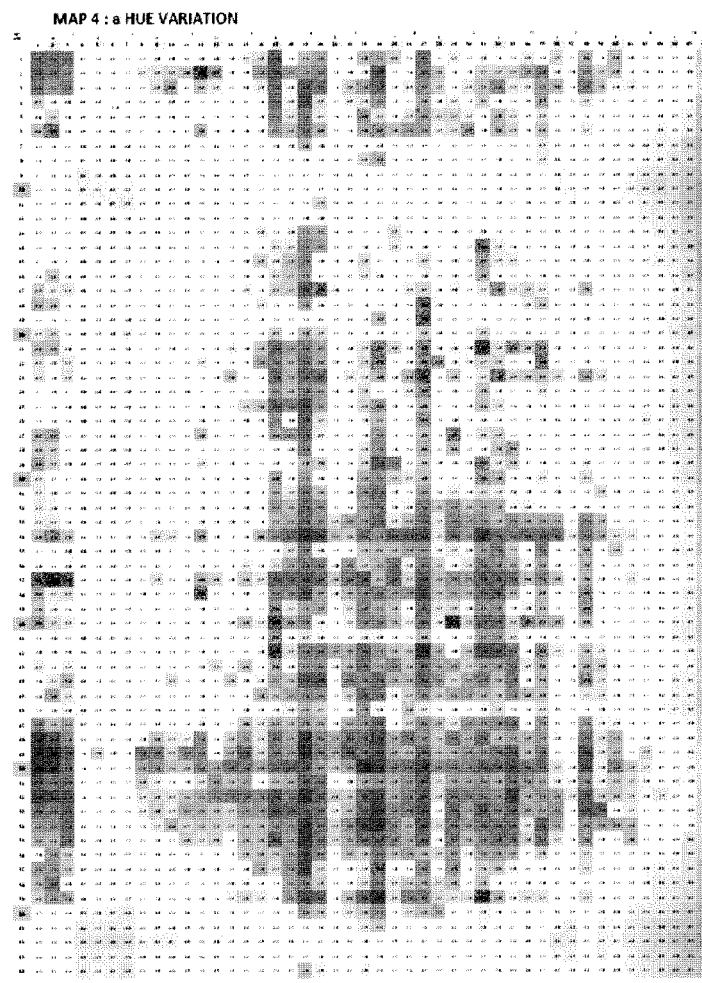
FIG. 17 shows an example of a map from which variance of a* hue can be determined.

(4) Map 4—a* Hue Variation: Maps a* data from each measurement patch. Green is used to indicate patches with a* values less than the median (greenish) while red is used to indicate patches with a* value greater than the median (reddish). An example of such a map is shown in FIG. 17.

Figure 18:
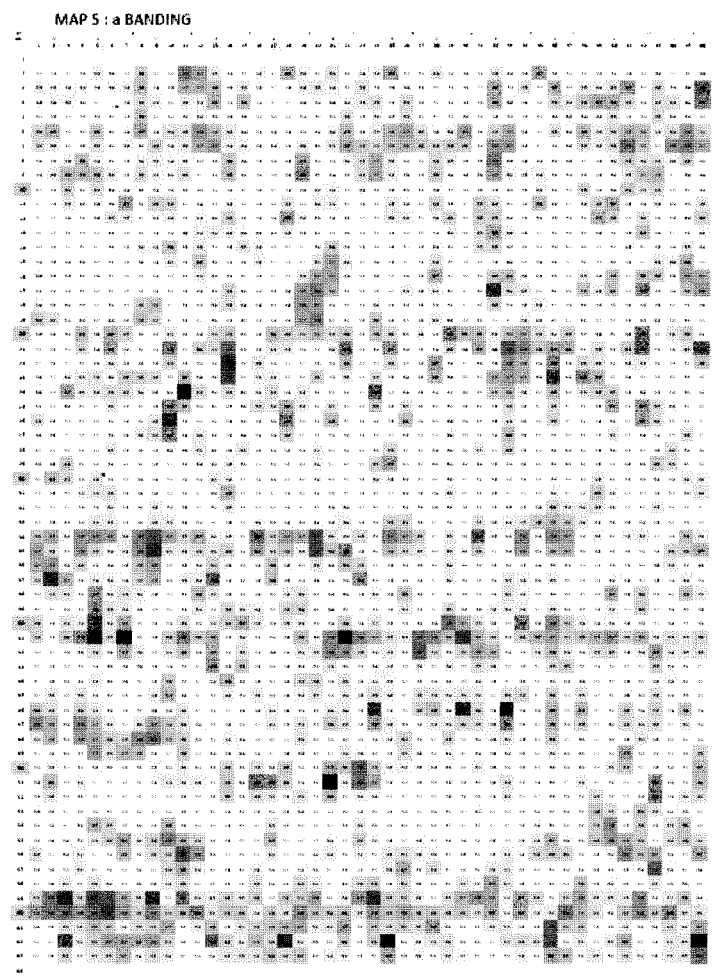
FIG. 18 shows an example of a map from which a* banding can be determined.

(5) Map 5—a* Banding: Calculates areas of rapid a* component change by comparing and mapping a* value of multiple adjacent vertical patches. Areas of high a* change are indicated by black/dark yellow while areas of low a* change are indicated by white to light yellow. Areas of high a* change indicate edges of bands with a red-to-green hue shift. An example of such a map is shown in FIG. 18.

Figure 19:
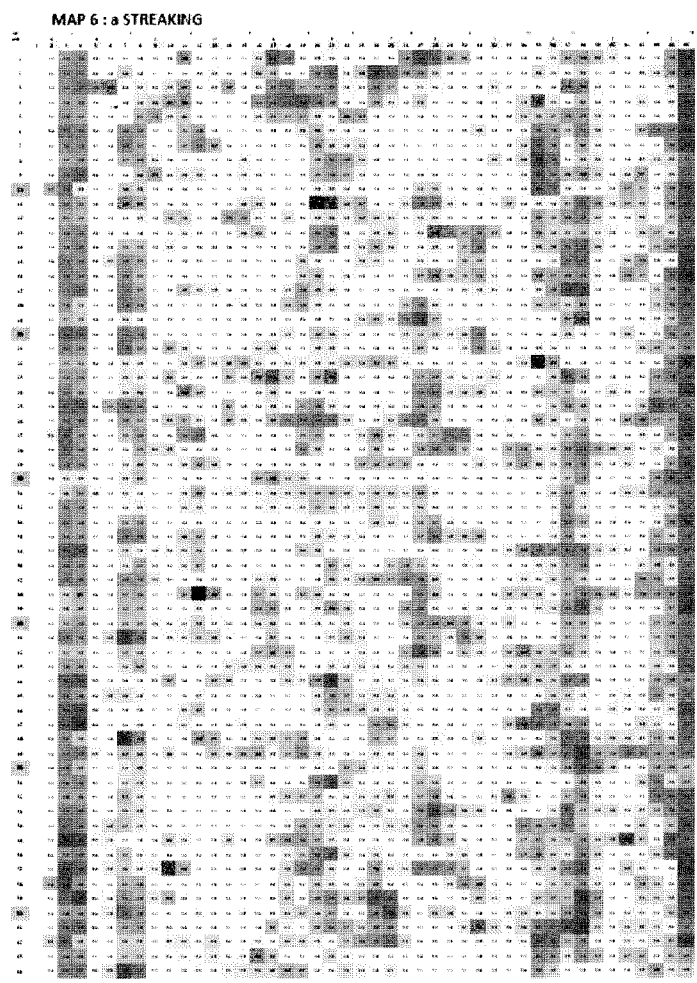
FIG. 19 shows an example of a map from which a* streaking can be determined.

(6) Map 6—a* Streaking: Calculates areas of rapid a* component change by comparing and mapping a* values of multiple adjacent horizontal patches. Areas of high a* change are indicated by dark to medium red while areas of low a* change are indicated by white to yellowish. Areas of high a* change indicate edges of streaks with a reddish-to-greenish hue shift. An example of such a map is shown in FIG. 19.

Figure 20:
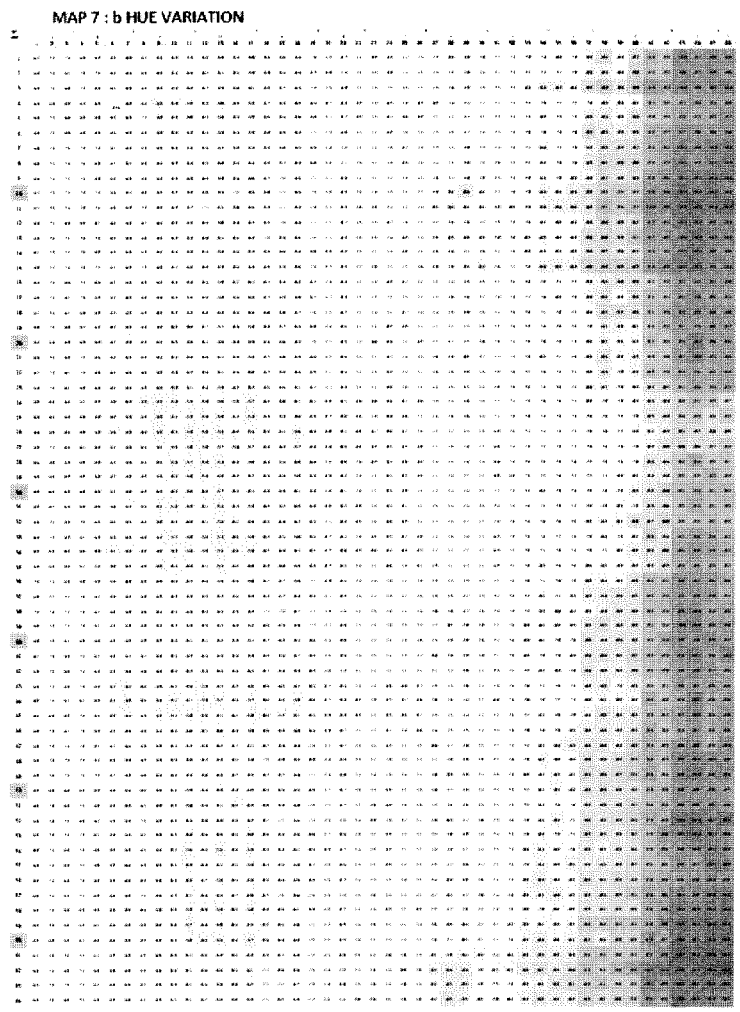
FIG. 20 shows an example of a map from which variance of b* hue can be determined.

(7) Map 7—Hue Variation: Maps V data from each measurement patch. Blue is used to indicate patches with b* values less than the median (bluish) while yellow is used to indicate patches with b* values greater than the median (yellowish). An example of such a map is shown in FIG. 20.

Figure 21:
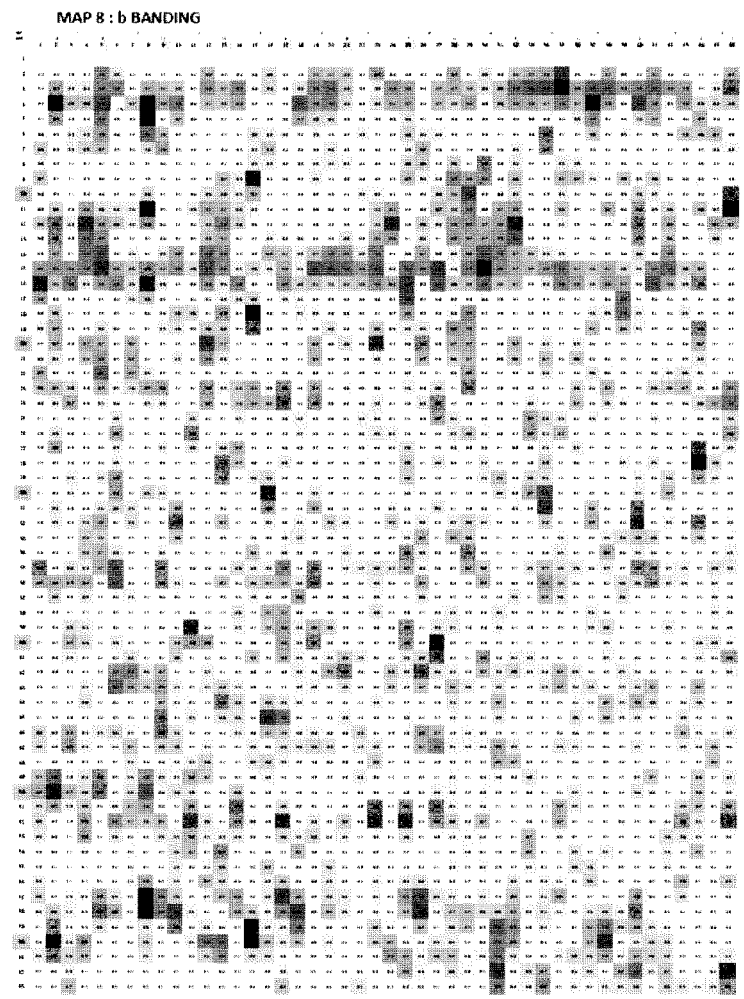
FIG. 21 shows an example of a map from which b* banding can be determined.

(8) Map 8—bµBanding: Calculates areas of rapid b* component change by comparing and mapping b* value of multiple adjacent vertical patches. Areas of high b* change are indicated by black/dark yellow while areas of low b* change are indicated by white to light yellow. Areas of high b* change indicate edges of bands with a yellowish-to-bluish hue shift. An example of such a map is shown in FIG. 21.

Figure 22:
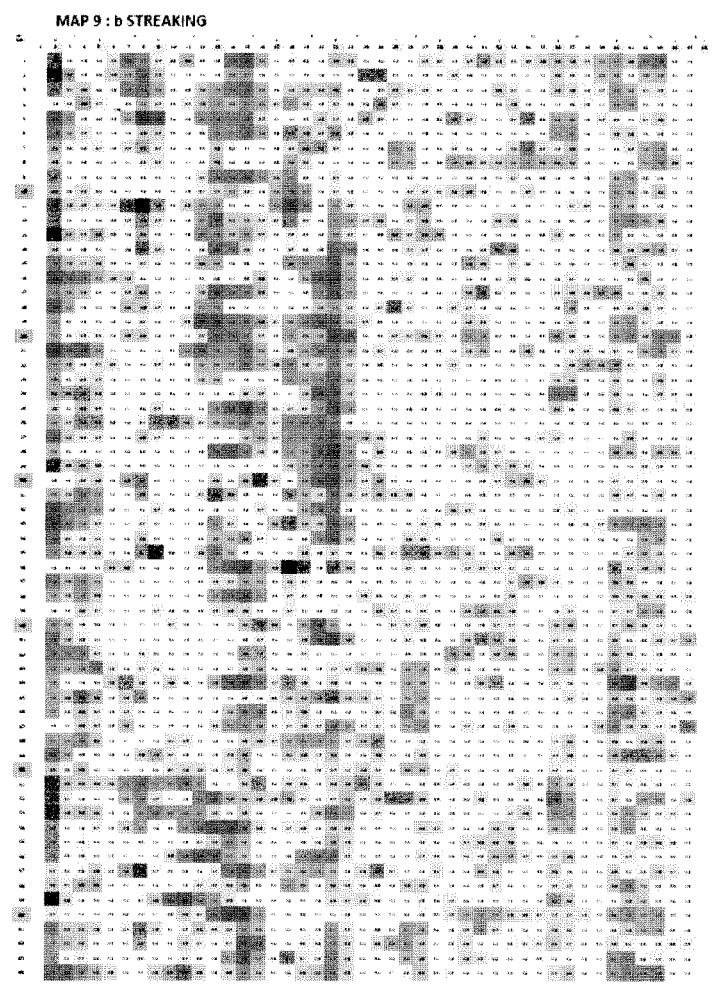
FIG. 22 shows an example of a map from which b* streaking can be determined.

(9) Map 9—b* Streaking: Calculates areas of rapid b* component change by comparing and mapping b* values of multiple adjacent horizontal patches. Areas of high b* change are indicated by dark to medium red while areas of low b* change are indicated by white to yellowish. Areas of high b* change indicate edges of streaks with a yellowish-to-bluish hue shift. An example of such a map is shown in FIG. 22.

Referring back to FIG. 5, the corrective action determining part 101c of the quantitative assessment providing unit 101 determines corrective actions (S505) directed to banding, streaking, intra-page color inconsistency, localized color variation and etc. based on the scores received (S504) from the analysis part 101b.

For example, the corrective action determining part 101c may compare the quantitative scores received from the analysis part 101b to a quantitative score baseline (i.e. a set of minimum scores needed for a particular print device to be considered acceptable, which may be similar to the exemplary guidelines described above) and determine whether corrective actions are needed, and if so, what kind of corrective actions are needed. An example of a quantitative score baseline is shown in FIG. 7.

For example, if the M-score (consistency score) is less than 60, the image quality is deemed unacceptable, and appropriate corrective steps are determined to resolve the problem. Similarly, if the banding index or streaking index is unacceptably high, appropriate steps to remedy the banding or streaking problem are determined.

For example, a software diagnose tool can determine corrective steps necessary to resolve the identified problems (e.g. banding or streaking). In another exemplary embodiment, a system administrator or an experienced professional may identify potential problems with the printer by looking at the generated scores and graphs, and figure out the corrective steps necessary to resolve the identified problems. There may be provided standard service manual and service bulletins, and other tuning guides for quantitative assessment procedure, which can be consulted by such professionals or less-experienced users of printers to figure out the appropriate corrective steps to be performed on the printers.

<Evaluation and Corrective Action Process Steps>

An exemplary corrective action procedure, which includes steps to be performed on a target print device ("printer") by a system administrator or an IT staff, is described below.

(1) Step 1: Print the three gray-tone test forms and the four color test forms to record a baseline of the printer and define a standard set of printer parameters (e.g. along with other print controller parameters) to be used through the process. Turn off the output profile and other color mapping on the print controller. Visually inspect the test forms to detect issues that may be addressed by known corrective action as dictated by the Service Bulletins (a manual containing instructions or recommended procedures for maintenance and repair) for the printer.

(2) Step 2: Implement any corrective hardware changes as dictated by the printer Service Bulletins and guided by the test form output. Any needed preventive maintenance (PM) should be performed. Also inspect for fine streaking that may be associated with excess zinc stearate drum lubricant. Apply the appropriate Service Bulletin changes if needed.

(3) Step 3: Re-print the test forms. Measure the 40% gray form with a test pattern reading unit and input the data into an Excel spreadsheet. Evaluate the generated test report (e.g. FIGS. 6 and 8-22) using the guidelines and expectations described above. Decide whether the data indicates that significant improvement might be expected or if the printer is already performing at a sufficient quality level. If the printer is performing as expected, stop here. Otherwise move to Step 4.

(4) Step 4: Measure, spreadsheet and evaluate the four color test forms as well at least one gray sheet (20% or 40% recommended). Use the objective data to tune the printer as indicated below ("color consistency tuning" discussed infra). Iterate the assessment procedure as necessary to meet target expectations. Print problematic customer documents during the process to subjectively judge improvements. Stop when the customer is satisfied, or when no further improvement in the measured data is seen.

With reference to the quantitative scores obtained from three gray test forms, which are shown in FIGS. 6A-6C, an exemplary analysis of the quantitative scores and graphs is explained.

Such quantitative scores and graphs are obtained by processing the spectral data produced when the gray test forms are scanned, such as by using a spectrophotometer.

As discussed above, the quantitative scores obtained from the spectral data produced by the test pattern reading unit can be analyzed to identify any image quality issues of the target print device. For example, inspection of the test forms reveals the following data:

(1) Delta-E: 8.35-12.28 (should be <6)
(2) Delta L*: 5.42-8.95 (density changes across the test forms)
(3) Delta a*: 3.08-5.12 (hue changes across the test forms)
(4) Delta b*: 5.55-6.67 (hue changes across the test forms)

Also, averaging scanned data in the primary scan direction shows the following data:

(5) Delta L*: 3.94-5.25
(6) Delta L*: 2.50-3.08
(7) Delta L*: 3.83-4.42

The level of variation indicates that there would be obvious density, hue and chroma variation across some of the print jobs printed on this particular print device Also, as indicated in FIG. 6B, the high intra-page consistency score and the high streaking index indicate visible color variation and visible streaking across the test page.

In addition, the banding-to-streaking indices have values ranging from 0.52 to 0.88, indicating that streaking is more of an issue than banding.

Also, the graphs generated using the spectral data from the test pattern reading unit can be analyzed to identify image quality issues. For example, by looking at FIGS. 8B, 10B and 12B (which are generated based on the gray test form corresponding to FIG. 6A), it can be determined that there is a fairly linear decrease in density from the operator side to the non-operator side in the L* graph. Also, the a* and b* graphs show a red-to-green hue shift from the non-operator side to the operator side, and a yellow-to-blue hue shift from the non-operator side to the operator side.

Likewise, the results obtained from the color test forms (M, K, C and Y, in that order), which are shown in FIGS. 6D-6G, can be examined in a similar manner to analyze single-toner image quality of the print device. For example, the cyan test form (corresponding to FIG. 6F) shows good cyan color consistency, with an intra-page consistency score of 3.48. Thus, linearization (to improve the density/hue/chroma consistency) is not necessary. On the other hand, the yellow test form (corresponding to FIG. 6G) has an intra-page consistency score of 8.55, indicating that color variation will be obvious in most prints. Thus, the yellow image quality can be improved with linearization.

Such analyses and evaluations are based on numerical data produced by the test pattern reading unit, and thus it is possible to identify image quality issues that may not be easily perceptible by a human eye. Also, the quantitative scores and graphs allow objective comparison between different test patterns and different print devices.

Based on the analyses and evaluations discussed above, corrective actions can be proposed. An exemplary proposal of corrective actions is described below. However, the following proposal is merely an example, and a variety of other proposals (proposing corrective actions for a particular print device) can be made.

(1) The gray test forms may be reprinted prior to making any changes for future comparison. Also, if there exists a known print job prone to cause streaking, banding or color variation across the page, such a print job may be printed for future comparison.

(2) The presence of narrow-line streaking likely indicates an excess zinc stearate lubricant is being applied to the drums. In such a case, a corrective action that can be applied is to reduce the pressure on the lubricant bar. The entire cleaning and lubrication unit, including all rollers and blades, needs to be well vacuumed and cleaned in addition to reducing the spring tension. The presence of fireflies may be caused by excess lubricant particles, so the cleaning is very important. This procedure may be described in a Service Bulletin for the target print device and is preferably performed on all four drum/cleaning/lubrication units. After all cleaning and spring tension reduction is done, a drum refresh cycle should be performed to help clean the excess lubricant from the drums. Streaking should be reduced after performing this procedure.

(3) Density and colorant variation in Magenta, Yellow and Black indicate improvement is likely in density and hue control by changing the power curve of the respective laser shading coefficients. This is usually an iterative process, and adjustments should be made to the settings for each of the toner colors above (Magenta, Yellow and Black) to reduce density and colorant variation.

(4) The test forms and files from (1) may be reprinted to determine whether any improvement in streaking and cross-page color consistency has been made. There may also be some lesser improvement in banding.

With reference to the examples shown in FIGS. 23-25, an iterative testing process is described below.

Figure 23:
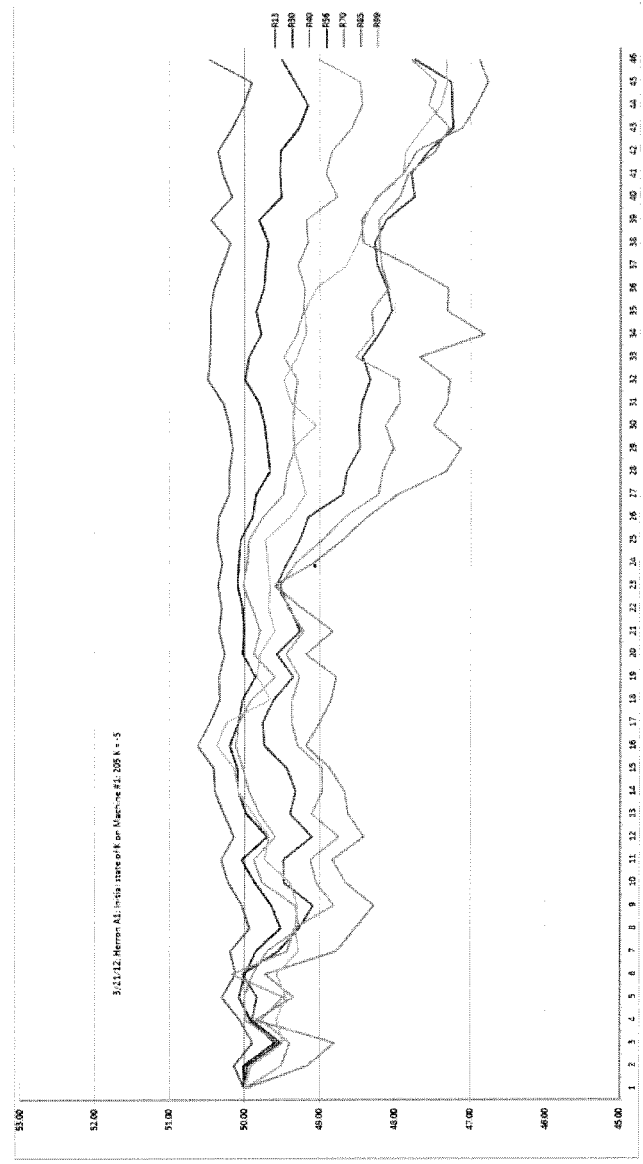
FIG. 23 shows an example of a graph from which variance of K densities can be determined.
Figure 24:
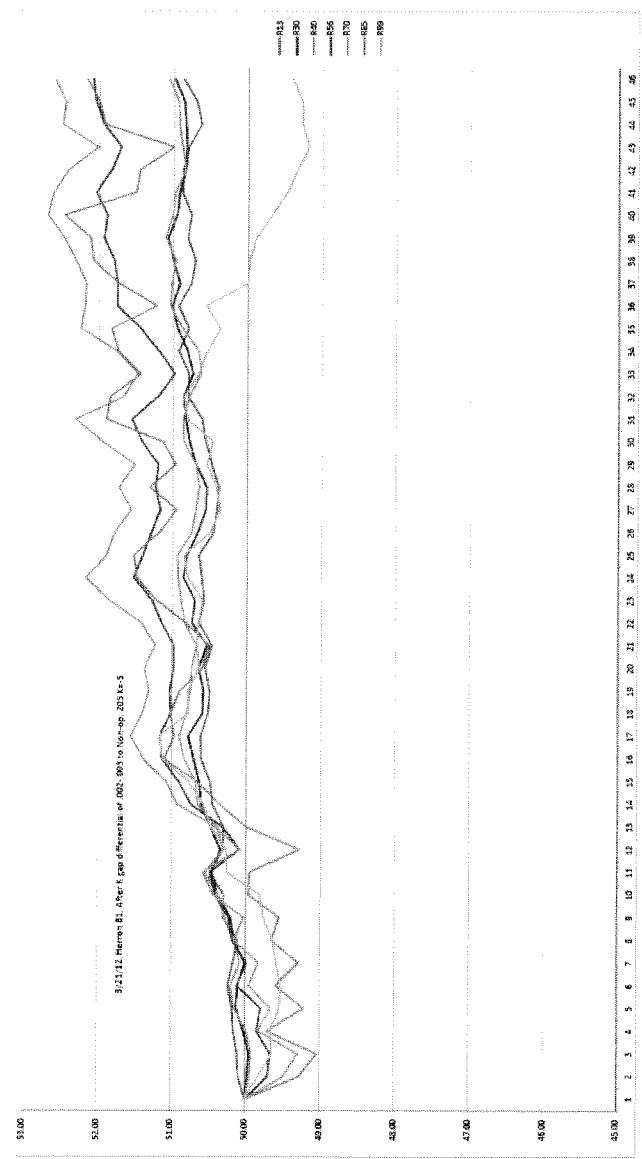
FIG. 24 shows an example of another graph from which variance of K densities can be determined.
Figure 25:
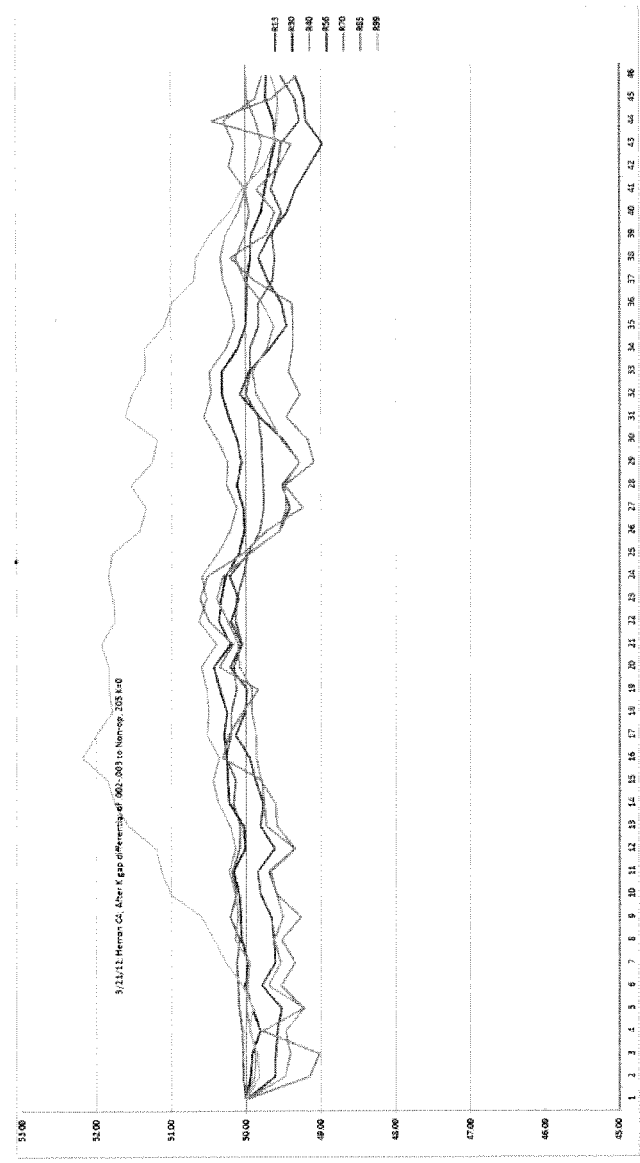
FIG. 25 shows an example of another graph from which variance of K densities can be determined.

FIGS. 23-25 show graphs indicating printer densities at 7 different percentages of K (13%, 30%, 40%, 56%, 70%, 85% and 99%). The vertical scale is in L* density units (L* of L*a*b*). The densities are listed in the legend to the right side of the graphs. The graphs show the scanned density at each of multiple different positions across the page in the non-operator side (left) to operator side (right) for each of the percentage densities of 13%, 30%, 40%, 56%, 70%, 85% and 99%. The graphs have been normalized to place the left hand point of each curve at 50, and thus the graphs show relative densities rather than absolute densities.

In FIG. 23, the density increase is about 3 delta L* across the page. When combined with the C, M and Y showing similar density shifts, the total would easily be in the 6-7 delta-E range.

FIG. 24 shows the result after a corrective step is performed (in this case, a doctor blade in the target printer was skewed, creating a differential of 0.002-0.003 inch, with the gap being smaller on the operator side). As shown in FIG. 24, the operator side densities have all been reduced and compressed closer together.

FIG. 25 shows the result after another corrective step is performed (in this case, an internal variable was modified). The K density is now within a 1 delta *L band and remains consistent across the page.

The 99% curve in the graphs shown in FIGS. 24 and 25 is an anomaly that can be ignored since it is seldom used in halftone images.

<Color Consistency Tuning>

Color consistency tuning is an iterative process of several experimental steps. A report containing the aforementioned data described above (FIGS. 6-22) can be used to better guide the process with objective data. It can also save time by indicating when the printer is running well and if any further improvement can be expected. An exemplary color consistency tuning guide is described below. Tuning steps are described in rough order of importance. Some of them may be executed in an iterative fashion. In addition to the steps described below, a more detailed Service Bulletins can be created to guide the tuning process.

(1) Begin by optimizing the print controller setup. Two important parameters are the screening and resolution values. For example, highest M-Scores have been observed using 175 line screening, and 150 dot screening has been known to sometimes minimize banding/streaking. Try both screening types with the test charts and user files to determine the best result. Changing the resolution value may also have an effect on banding/streaking, but may have either a positive or negative effect on customer files. Select a resolution to begin the test process and stick with it, (2) Consult relevant articles on color consistency optimization for the target print device for input on custom high GCR (gray component replacement) profiles and other print controller parameters. A high GCR profile will not affect the test charts but may have a beneficial effect on customer documents.

(3) Evaluate the test forms to determine gray consistency, and individual toner color consistency. There may not be a perfect correlation between individual color toner consistency and gray tone consistency. Therefore, both individual toner color as well as gray consistency needs to be evaluated simultaneously. If color consistency is still insufficient after making any possible print controller and/or profile changes, other changes may be necessary. Other corrective actions may include laser power changes (shading coefficient) on the target print device. Each toner color has a primary and secondary "director" indicator.

Cyan: The Cyan L* graph correlates well with Cyan a* and b* data and can be used as the primary director. b* typically tracks Cyan a bit better than a* and thus can be used as a secondary director. Use Cyan L* as primary guidance on Cyan tuning. Higher density (lower L*) indicates too much Cyan toner while lower density (higher L*) indicates too little Cyan toner.

Magenta: The Magenta L* graph correlates well with Magenta a* and b* data and can be used as the primary director. a* is a much better director than b* and can be used as a secondary director. Higher density (lower L*) indicates too much Magenta toner while lower density (higher L*) indicates too little Magenta toner.

Black: L* in the Black L* graph is the primary director. a* and b* are meaningless for black toner, Yellow: L* in the Yellow L* graph is meaningless. b* is the primary director.

(4) Evaluate the individual toner data with the gray data looking for toner moves consistent with both sets of data. Question inconsistent moves and look for a different solution.

(5) If an individual color change appears appropriate, look for rough linearity in the graph of the director component. If it appears that the curve might be improved by flattening the curve, adjust the printer settings available (e.g. for each toner color) to increase toner density/chroma toward the operator side or the non-operator side depending on the circumstances. If desired changes appear random, laser segment shading changes may be needed. The toner density/chroma changes should be made prior to attempting to change the laser segment shading.

(6) In addition, localized toner density/chroma may be increased or decreased for each toner color to improve the image quality.

The measurement method and the particular print device being assessed may have an inherent variance factor. However, such variance does not affect the tuning of the print device.

There are various circumstances in which quantitative assessment may be useful. For example, in initial manufacturing or configuration, any machine not meeting a minimal test score can be reworked. Test scores may be shipped with the respective machine as a baseline for later service. Also, distribution of the machines may be altered based on the scores. For example, high scoring machines could be allocated to users with critical color matching or image quality requirements (such as consistency with GRACol/G7 printing requirements).

As another example, during initial install of the machine, a full diagnostic forms set can be printed and stored for future use. For example, if a customer raises an issue at a later date, claiming that the output of the machine has changed, the initial test pages can be analyzed along with a current set. The results will show the degree of change in the machine output, if any, and help determine necessary corrective actions.

Further, for purposes of periodic check-up, a full diagnostic forms set can be printed at initial install, with some of the forms (e.g. the gray 40% form) being read and analyzed. At regular intervals thereafter, the test forms are reprinted. The same forms are read and analyzed, and if the results differ from the initial or previous baseline by a predetermined margin in a detrimental direction, all forms can be read and analyzed to help determine corrective actions.

In addition, such approach can be used for problem diagnosis and correction. When a user or customer reports an image quality issue that cannot otherwise be handled by standard service procedures, a full diagnostic forms set is printed, read and analyzed. The results are graded and compared to expected norms for the printer class, and to the results of the test set printed at system install. If the results are substandard, the data is used to help diagnose the problem and determine needed corrective actions. If the results meet expectations of the printer class, the user or customer is informed that the printer is operating within expectations. For example, data is collected from multiple customer installations (e.g. in a global database) to help determine such expected norms of operation.

Further, when customer installation signoff is part of the process, the test forms and numeric results can be used to achieve installation acceptance signoff from a potential customer. If needed, one or more constant color test pages with customer-specified critical colors could be added to the standard test form packet. These additional pages would most likely contain banding/streaking prone colors, or difficult to achieve colors. The customer would determine acceptable output through visual inspection. The pages would be printed and read, with a customer-acceptable score determined and recorded. If the customer suspects image quality degradation in the future, test pages would be re-printed and compared to initial results, as discussed above.

As another example, for customers requiring or requesting the highest standard in color consistency and repeatability, a certified system approach could be established using the quantitative assessment (CMEC) procedure as a controlling mechanism. Delivery of advanced services, such as system profiling, plus added machine support services, such as more frequent preventive maintenance, could be bundled and charged to the customer. Specific tolerances for machine operation would need to be established based upon CMEC measured results.

The aforementioned quantitative assessment is independent of the marking and developing technology and is not limited to any particular printing technology (e.g., laser printing, LED printing, geljet printing, inkjet printing and etc.).

Some of the potential advantages of the aforementioned approach include (but are not limited to): (1) instrumented measurement of printer image quality; (2) data-based analysis and evaluation; (3) long-term performance measurement and tracking of print quality; (4) corrective action based on objective data; (5) comparison of before and after results; and (6) objective method of image quality quantification.

The aforementioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A system for objective, quantitative assessment of quality of output by a target print device, said system comprising:
  a control part that supplies image data to the target print device to cause the target print device to print a test pattern on a contiguous area of a test form, the contiguous area being segmented into plural elements in a primary scan direction and plural elements in a secondary scan direction, the image data being constituted by constant tone across the contiguous area in both the primary scan direction and the secondary scan direction;
  a test pattern reading part that reads the test pattern on the contiguous area of the test form, and outputs spectral data including measurements for the plural elements in the primary scan direction and measurements for the plural elements in the secondary scan direction;
  an analysis part that calculates a first numerical quantitative score by comparing the measurements of a specific column of one or more elements, arranged in the primary scan direction, amongst the plural elements with the measurements of an adjacent column of one or more adjacent elements, arranged in the primary scan direction, and calculates a second numerical quantitative score by comparing the measurements of a specific row of one or more elements, arranged in the secondary scan direction, amongst the plural elements with the measurements of an adjacent row of one or more adjacent elements, arranged in the secondary scan direction; and
  a corrective action determining part that compares the first and second numerical quantitative scores to a quantitative score baseline, for determining one or more corrective actions to be performed on the target print device, based on results of the comparison.

2. The system of claim 1, wherein the corrective action determining part determines at least one of banding and streaking, by utilizing the quantitative scores, and determines the corrective actions directed to said at least one of banding and streaking.

3. The system of claim 1, wherein the corrective action determining part determines at least one of intra-page color inconsistency and localized color variation, by utilizing the quantitative scores, and determines the corrective actions directed to said at least one of intra-page color inconsistency and localized color variation.

4. The system of claim 1, wherein the corrective action determining part compares the quantitative scores to a quantitative score baseline to determine whether corrective action is needed.

5. The system of claim 1, wherein the analysis part utilizes the quantitative scores to generate one or more graphical representations of variance of tone density, variance of hue and variance of chroma.

6. The system of claim 1, wherein
  the control part controls the target print device to print test patterns on plural test forms, and the plural test forms include plural forms of respective different constant gray tone densities and plural forms of respective different constant color tones,
  the test pattern reading part reads the test patterns on the plural test forms, and outputs spectral data for the test patterns, and
  the analysis part analyzes the spectral data for the test patterns to determine sets of quantitative scores for respective ones of the test patterns.

7. The system of claim 1, further comprising:
  a corrective action determining part that determines one or more corrective actions, based on the quantitative scores, and outputs the corrective actions as suggestions of tasks to be performed on the target print device.

8. The system of claim 1, wherein the quantitative scores include: a localized color variation score; an intra-page color inconsistency score; a streaking index; a banding index; a density variation score; a hue or chroma variation score; and a banding-to-streaking index.

9. The system of claim 1, further comprising:
  a storage part that stores the one or more quantitative scores along with device information of the target print device, wherein the analysis part retrieves the quantitative scores.

10. A method for providing objective, quantitative assessment of quality of output by a target print device, said method comprising:
  (a) supplying image data to the target print device to cause the target print device to print a test pattern;
  (b) controlling the target print device to print the test pattern on a contiguous area of a test form, the contiguous area being segmented into plural elements in a primary scan direction and plural elements in a secondary scan direction, and the image data being constituted by constant tone across the contiguous area in both the primary scan direction and the secondary scan direction;
  (c) causing a test pattern reading apparatus to read the test pattern printed by the target print device on the contiguous area of the test form, and outputting spectral data including measurements for the plural elements in the primary scan direction and measurements for the plural elements in the secondary scan direction;
  (d) calculating a first numerical quantitative score by comparing the measurements of a specific column of one or more elements, arranged in the primary scan direction, amongst the plural elements with the measurements of an adjacent column of one or more adjacent elements, arranged in the primary scan direction, and calculating a second numerical quantitative score by comparing the measurements of a specific row of one or more elements, arranged in the secondary scan direction, amongst the plural elements with the measurements of an adjacent row of one or more adjacent elements, arranged in the secondary scan direction; and
  (e) comparing the first and second numerical quantitative scores determined in (d) to a quantitative score baseline, and determining one or more corrective actions to be performed on the target print device, based results of the comparison.

11. The method as claimed in claim 10, further comprising:
  determining one or more corrective actions to be performed on the target print device, based on the quantitative scores.

12. The method as claimed in claim 11, further comprising:
  identifying a problem including at least one of banding, streaking, intra-page color inconsistency and localized color variation; and
  determining one or more corrective actions targeted at resolving the identified problem.

13. The method as claimed in claim 10, further comprising:
comparing the quantitative scores to a quantitative score baseline to determine whether corrective action is needed.

14. The method as claimed in claim 10, further comprising:
maintaining in a database (i) results of the quantitative assessment including the one or more quantitative scores and (ii) device information of the target print device.

15. The method as claimed in claim 10, further comprising:
generating one or more graphical representations of variance of toner density, variance of lightness, variance of a position in a red-green spectrum, variance of a position in a yellow-blue spectrum, and variance of hue.

16. The method of claim 10, further comprising:
providing image data including test patterns to be printed on plural test forms comprising plural forms of respective different constant gray tone densities and plural forms of respective different constant color tones;
performing (a), (b), (c) and (d) for each one of the plural test forms; and
determining, based on the quantitative scores, a corrective action to be performed on the target print device.

17. The method as claimed in claim 10, further comprising:
determining one or more corrective actions, based on the quantitative scores, and outputting the corrective actions as suggestions of tasks to be performed on the target print device.

* * * * *